(12) United States Patent
Brown et al.

(10) Patent No.: US 10,529,041 B2
(45) Date of Patent: Jan. 7, 2020

(54) SYSTEM AND METHOD FOR MANAGING TRANSACTIONS IN DYNAMIC DIGITAL DOCUMENTS

(71) Applicant: R3 Ltd., London (GB)

(72) Inventors: Richard Gendal Brown, London (GB); Michael Christopher Hearn, Zurich (CH); James William George Carlyle, Winchester (GB)

(73) Assignee: RS LTD., London (GB)

( * ) Notice: Subject to any disclaimer, the term of this patent is extended or adjusted under 35 U.S.C. 154(b) by 625 days.

(21) Appl. No.: 15/243,473

(22) Filed: Aug. 22, 2016

(65) Prior Publication Data

US 2017/0301047 A1    Oct. 19, 2017

Related U.S. Application Data

(60) Provisional application No. 62/323,952, filed on Apr. 18, 2016.

(51) Int. Cl.
| | |
|---|---|
| *G06Q 50/18* | (2012.01) |
| *H04L 9/32* | (2006.01) |
| *G06Q 40/00* | (2012.01) |
| *G06Q 20/02* | (2012.01) |
| *G06Q 20/38* | (2012.01) |

(52) U.S. Cl.
CPC ............ *G06Q 50/18* (2013.01); *G06Q 20/02* (2013.01); *G06Q 20/3825* (2013.01); *G06Q 20/3827* (2013.01); *G06Q 40/12* (2013.12); *H04L 9/3247* (2013.01)

(58) Field of Classification Search
None
See application file for complete search history.

(56) References Cited

U.S. PATENT DOCUMENTS

| | | |
|---|---|---|
| 2017/0300872 A1 | 10/2017 | Brown |
| 2017/0301033 A1 | 10/2017 | Brown |

FOREIGN PATENT DOCUMENTS

WO    2017182788 A1    10/2017

OTHER PUBLICATIONS

Peters, Gareth William et al., "Understanding Modern Banking Ledgers through Blockchain Technologies: Future of Transaction Processing and Smart Contracts on the Internet of Money," Nov. 19, 2015 URL:http://www.the-blockchain.com/docs/Understanding Modern Banking Ledgers through Blockchain Technologies.pdf private distributed ledger.

(Continued)

*Primary Examiner* — Jay Huang
*Assistant Examiner* — Gabriel Mercado
(74) *Attorney, Agent, or Firm* — Perkins Coie LLP

(57) ABSTRACT

System and methods for managing dynamic electronic documents on a private distributed ledger comprise establishing a dynamic electronic document comprising a first state object, wherein the state object references a prior approved first transaction; proposing a second transaction comprising as an input the first state object and as an output a transaction command to alter the state object as well as what parameters are required to validate the second transaction; validating the proposed second transaction; and updating the state object on a private distributed ledger to reference the second transaction.

4 Claims, 14 Drawing Sheets

(56) References Cited

OTHER PUBLICATIONS

Florian Tschorsch et al., "Bitcoin and Beyond: A Technical Survey on Decentralized Digital Currencies," International Associates for Cryptologic Research, vol. 20150517: 090557, May 15, 2015 (May 16, 2015), pp. 1-37, XP061018443).
Bitfury: "Public versus Private Blockchains Part 2: Permissionless Blockchains White Paper," Oct. 20, 2015 (Oct. 20, 2015) XP055384695 retrieved from the Internet: URL:http://www.the-blockchain.com/docs/Jeff Garzik Public vs Private Blockchain pt2.pdf.
Castro, Miguel et al: "Practical byzantine fault tolerance and proactive recovery" ACM Transactions on Computer Systems (TOCS), Nov. 1, 2002 (Nov. 1, 2002) pp. 398-461 XP055384854, New York, Retrieved from the Internet: URL:http://others.kelehrs.me/pdftByzantine.pdf abstract.
International Search Report and Written Opinion issued for PCT/GB2017/051069 dated Jul. 6, 2017.
Google: "Hyperledger Whitepaper" Feb. 17, 2016 (Feb. 17, 2016), XP055342588 retrieved from the Internet: URL: http://www.the-blockchain.com/docs/Hyperledger Whitepaper.pdf.
White Paper, https://github.com/ethereum/wiki/wiki/White-Paper, retrieved Feb. 27, 2017, 25 pages.
Grigg, Ian, "The Ricardian Contract," Proceedings of the First IEEE International Workshop on Electronic Contracting, pp. 25-31, IEEE, 2004.
Grigg, Ian, "Digital Trading," Conference Paper, http://iang.org/papers/digital_trading.html, retrieved Sep. 26, 2016, 19 pages.
Grigg, Ian, "The Ricardian Contract," http://iang.org/papers/ricardian_contract.html/ retrieved Feb. 27, 2017, 7 pages.
Ricardian Contract, https://en.wikipedia.org/wiki/Ricardian_Contract, 5 pages.
Nakamoto, Satoshi, "Bitcoin: A Peer-to-Peer Electronic Cash System," http://www.bitcoin.org/bitcoin.pdf, pp. 1-9, Jul. 4, 2010.
Wood, Gavin, "Ethereum: A Secure Decentralised Generalised Transaction Ledger," EIP-150 Revision, http://gavwood.com/paper.pdf, retrieved Mar. 1, 2017 pp. 1-32.

SYSTEM AND METHOD FOR MANAGING TRANSACTIONS IN DYNAMIC DIGITAL DOCUMENTS

RELATION TO OTHER APPLICATIONS

This application claims the benefit of priority to U.S. Provisional Patent Application No. 62/323,952, entitled "System and method for managing transactions in digital documents", filed Apr. 18, 2016, the contents of which are incorporated herein by reference in its entirety.

BACKGROUND

Field

The present disclosure is related to dynamic electronic transactions and more particularly to providing secure and immutable copies of dynamic electronic transactions between two or more parties.

Background

Current state of the art software platforms employ certain architectural elements and techniques inspired by decentralized ledgers, such as the blockchain design of Bitcoin as well as other related systems. Some commentary suggests that these blockchain technologies could have transformational impact in multiple industries. However, it is not immediately known that traditional blockchain architectures such as those underpinning Bitcoin and Ethereum, which are designed for a threat model focused on censorship-resistance in a permission less environment, are directly transferable to industries and problems that do not share Bitcoin's and Ethereum's assumptions or requirements. The common design of an open shared ledger with global replication of data presents problems with scalability, transaction confidentiality, and interoperability, particularly in the context of systems that deliver consistent views of data to multiple, possibly untrusting parties.

A system that presents certain defining characteristics of blockchain platforms that are relevant and valuable to untrusting commercial entities is desirable and may include interoperability between mutually untrusting actors, which brings parties to shared facts to consensus as to the details of those facts and their evolution over time. In this regard, in many aspects, it is the parties to an agreement, and only the parties to an agreement that need to come to consensus on the state of that agreement and the shared facts relating to it. Traditional blockchain architectures and implementations do not provide a workable solution for limiting access to the terms and conditions of an agreement, contract, or other dynamic document on the distributed ledger. Instead, blockchain implementations have preferred global replication of every transaction to ensure all parties with access to the ledger, but not necessarily involved in any one transaction, have current and immutable information.

Banks were amongst the earliest adopters of information technology, automating previously manual processes and in digitizing previously physical processes. However, there are significant opportunities to improve the cost and efficiency of the digital and system architectures that emerged.

For example and with regard to firm-level banking architecture—each bank has its own ledgers, which record that firm's view of its agreements and positions with respect to its customer set and its counterparts—and its counterparts, in turn, maintain their views. This duplication, whilst robust, may and often does lead to inconsistencies, and it drives a need for costly matching, reconciliation and fixing of errors by and among the various parties to a transaction. To the extent that differences remain between two firms' views of the same transaction, this is also a source of risk, some of it potentially systemic.

And with regard to existing market solutions—they are often digital analogues of their physical predecessors. A visitor from 1900 would have no trouble understanding how securities trades are settled today, how global trade is financed and how payments via correspondent banks are processed: we have removed cost and optimized processes but whereas the web has given us a shared platform for the exchange of information, no equivalent integration has been achieved in the realm of financial transactions.

These phenomena impose operational burdens on banks, who must maintain countless integrations with market infrastructure providers and with each other, and who must run complex processes to ensure assets are where they need to be, with implications for liquidity and for operational risk. And they impede regulatory imperatives, particularly around transparency and timely access to information.

Additionally, these phenomena share a common feature: whilst the plurality of financial service providers drives competition and choice, the plurality of technology platforms upon which they rely drives complexity and creates operational risk. Until recently, this was unavoidable: there were few effective ways to consolidate technology across firms without also consolidating the firms themselves.

With the maturation of cryptographic techniques, exemplified in part by blockchain technology and other distributed ledger technologies, a new opportunity is presented with the possibility of authoritative systems of record that are securely shared between firms. This provides the opportunity to transform the economics of financial firms, for example in post-trade services, by implementing a new shared platform for the recording of financial events and processing of business logic: one where a single global logical ledger is authoritative for all agreements between firms recorded on it, even though the relationships and obligations recorded may remain between those firms. Indeed, a shared platform that allows parties to an agreement to maintain a shared understanding as to the state of that agreement without (1) the burdens of massively replicated data structures and (2) robust cryptography between firms or competitors to ensure privacy, would be desirable, as would a system that overcomes other disadvantages discussed above.

SUMMARY

Embodiments disclosed herein address the above stated needs by providing systems and methods that allow parties to an agreement to maintain a shared understanding as to the state of that agreement.

In an example embodiment of the present invention an electronic agreement between two parties to a shared distributed ledger, comprises: a database comprising a contract code file, wherein the contract code includes machine readable instructions defining permissible actions to which the electronic agreement may be associated with and a hash identifying the contract code. A database comprising a legal prose document, wherein the legal prose document includes human readable text describing obligations of each party and a hash identifying the legal prose document. Parameters specific to the electronic agreement defining a state of the agreement. And a verified acknowledgement of the electronic agreement by the two or more parties that confirms the parties' understanding of the state of the electronic agreement.

In another example embodiment of the present invention, a method of creating a state object describing an electronic agreement between two parties to a distributed ledger, comprises: establishing, by a processor at first node of a distributed ledger network, a database for storing state objects; storing, by the processor, a legal prose document comprising human readable text describing rights and/or obligations of each party and a hash identifying the legal prose document, wherein the legal prose document includes one or more fields of undefined value, said value to be defined by a parameters document; storing, by the processor, a contract code comprising machine readable instructions defining permissible actions to which the electronic agreement may be associated with and a hash identifying the contract code, wherein said permissible actions are defined in the legal prose document; storing, by the processor, parameters specific to the electronic agreement defining a state of the agreement, wherein the parameters include values defining one or more of the undefined fields in the legal prose; and receiving, by the processor, at least one electronic signature of a party to the electronic agreement, and establishing, by the processor a state object comprising the legal prose document, the contract code, the agreement parameters, the electronic signature.

In still another example embodiment of the present invention, A non-transitory computer-readable medium having stored thereon a set of instructions that are executable by a processor of a first host computer system at a first node of a distributed ledger network to carry out a method of establishing dynamic electronic agreement states comprising: storing, by the processor, a legal prose document comprising human readable text describing obligations of each party and a hash identifying the legal prose document, wherein the legal prose document includes one or more fields of undefined value, said value to be defined by a parameters document; storing, by the processor, a contract code comprising machine readable instructions defining permissible actions to which the electronic agreement may be associated with and a hash identifying the contract code, wherein said permissible actions are defined in the legal prose document; storing, by the processor, parameters specific to the electronic agreement defining a state of the agreement, wherein the parameters include values defining one or more of the undefined fields in the legal prose; receiving, by the processor, at least one electronic signature of a party to the electronic agreement; and establishing, by the processor, a state object comprising the legal prose document, the contract code, the agreement parameters, the electronic signature.

Further example embodiments of the present invention may include one or more of the following features. The contract code file further comprises one or more rules relating to the holding of an asset, obligation, or agreement by one or both of the parties. The contract code file further comprises a rule relating to an obligation of one or both parties, said obligation expressed in the legal prose document. The contract code include machine readable instructions that cause actions or enforce obligations for which the parties are responsible, as defined in the legal prose. The legal prose includes one or more blank fields upon which the contract code and parameters may supply the value. The blank fields comprise one or more of the following categories: currency type, asset type, value of currency, amount of asset, party to be paid, location of asset, security information, balance of asset, or balance of currency. The blank fields may represent any value or identifier that may be determined at a later date without changing the underlying rights or obligations of the parties to the state object or transaction. The parameters include at least one defined value related to one or more of the blank fields included in the legal prose document.

In one aspect of the present invention, a method for managing states of a dynamic electronic document, comprises the steps of: recording a dynamic electronic document establishing a first content state; proposing changes to the electronic document altering the first content state; verifying the proposed changes as valid; receiving the proposed changes; accepting the proposed changes; updating the dynamic electronic document having a second content state; and inputting the dynamic electronic document to a private distributed ledger.

In another aspect of the present invention, a method for validating and communicating changes to a dynamic electronic document between a first and second user or party, comprises the steps of: accessing a dynamic electronic document comprising a state object, proposing a first transaction comprising the state object, a transaction command; and validation protocols wherein the state object represents the current version of the dynamic electronic document as represented on a private distributed ledger, the transaction command represents the proposed changes to the state object, and/or, one or more parties to receive the first transaction; receiving the first transaction and accepting the transaction command; and updating the state object of the dynamic electronic document to reflect the accepted proposed first transaction and recording the updated state object on a private distributed ledger. Recording the updated state object includes recording a new state object having a new state or properties. The new state object may be recorded on a private distributed ledger or other data store attributed to each party to the transaction.

In yet another aspect of the invention a method for validating and communicating changes to dynamic electronic documents between multiple users, comprises the following steps: establishing a dynamic electronic document comprising a first state object, proposing a transaction comprising as an input the first state object and as an output a transaction command to alter the state object resulting in an output of a new state object, as well as what parameters are required to validate the transaction; validating the proposed transaction; and updating the state object on a private distributed ledger to reference the transaction, wherein the only individuals having access to the state object after approval of the transaction are the individuals referenced in the transaction.

In a further aspect of the invention, a method of validating the state of a dynamic electronic document, comprises the following steps: establishing a first transaction comprising a state object; in a second transaction, referencing the state object and first transaction, wherein a date-time stamp is affixed to the state object and the second transaction; in a third transaction, referencing the state object and the first transaction, wherein a date-time stamp is affixed to the state object and the second transaction; determining the uniqueness of the second and third transactions by comparing the date-time stamps of the second and third transactions, and assigning priority to the earliest date-time stamp, thereby validating the earliest of the second or third transaction and creating a uniqueness validated transaction; and permitting further processing of the uniqueness validated transaction; prohibiting further processing of the non-uniqueness validated transaction; and updating the state object on a private distributed ledger to reference the uniqueness validated transaction. In alternate embodiments a digital signature or other authentication certificate may be in conjunction with or as a substitute to the date-time stamp.

Additional aspects of the present invention may include one or more of the following features or steps. The dynamic electronic document comprises a state object having contract code based on legal prose. Changes to the electronic document impose a performance obligation to a first party. Proposed changes to the dynamic electronic document represent a proposed transaction between two parties having access over a network to the dynamic electronic document. Verification of the proposed changes to the dynamic electronic document comprises authenticating the current state of the dynamic electronic document and validating the source or content of the proposed changes. The dynamic electronic document comprises a state object identified by cryptographic hash. Proposed changes are received over a network by a party to the dynamic electronic document, and wherein the proposed changes include metadata that authenticates the source and/or content of the proposed changes. Upon receiving the proposed changes to the dynamic electronic document reference is made to the contract code in the input state objects to validate the proposed transaction. Alternatively reference may be made to the contract code from any state object, including input state object and output state objects. The private distributed ledger is accessible only to the parties identified in the first and second state of the dynamic electronic document. Transactions are identified with a cryptographic hash. Validation of the earliest priority of a second or third transaction comprises attaching a uniqueness certificate or signature to the transaction. A state object comprises a data field identifying a uniqueness service. Uniqueness validation of a second and third transaction does not occur and a uniqueness conflict certificate may be issued to the second and third transaction. Transactions and state objects further comprise metadata tags associated with content types within the state object or transaction commands. Selected information based on the metadata tags is shared with a third party. Selected information based on metadata tags of content in the state object or transaction is used to provide uniqueness verification of one or more transactions. The updated state object is assigned additional metadata tags associated with the most recent transaction. Aspects described herein may be written as program steps and stored on a computer readable medium.

In an even further still example embodiment of the present invention, a method of executing a transaction relating to an electronic agreement comprises: storing multiple state objects in a database at a node of a distributed ledger network; proposing a transaction between two parties that alters the state of a first state object; verifying that the proposed transaction is a valid transaction according to the rules of the first state object for example by reference to machine readable code in the first state object; executing the proposed transaction by altering the state of the first state object; and storing the altered first state object in the database at a node of a distributed ledger; wherein the first state object and the altered first state object are shared between the parties of the transaction and stored in the database while preventing access to such state objects by unrelated parties having access to the database.

And in an additional example embodiment of the present invention, a method of finalizing an electronic transaction between two parties comprises: storing at one or more nodes of a distributed ledger one or more input state objects; proposing a transaction relating to the one more input state objects, wherein the transaction comprises an input state object, a command, and an output state object; validating the proposed transaction, wherein validation comprises running the contract code for each type of contract referenced by the state objects in the transaction; and confirming electronic signatures for the input state object(s) and transaction; assigning a uniqueness identification to the transaction; verifying that the input state object(s) has not previously been consumed by a prior transaction; recording in a database the consumption of the input state object(s); verifying to one or more nodes in the distributed ledger that the transaction is finalized; and storing an output state object reflecting the outcome of the transaction.

Various example embodiments of the present invention may comprise one or more of the following features. The state object comprises a legal prose document, contract code, parameters, and a digital signature. The process of validating the proposed transaction is performed using a sub-process comprising: confirming by a party to the transaction that the transaction conforms with the contract code, signing by electronic signature the transaction after confirming the transaction is valid. The process of validating the proposed transaction is performed using a sub-process comprising: screening privacy data from the transaction and input state objects, wherein privacy data includes party identity or other data marked as private; wherein and signing the transaction by the validating smart notary and establishing that the proposed transaction is valid. The uniqueness identification is a date time stamp. The method further comprises assigning a uniqueness identification. The method further comprises submitting the transaction to a date time service, wherein the date time service functions as an notary to the distributed ledger. The step of verifying the uniqueness of the transaction further comprises: submitting the proposed transaction to a notary configured to; compare the input state object of the transaction to a database of consumed state objects; determine whether the input state object has been previously consumed; record that the input state object is consumed by the proposed transaction; and electronically sign the transaction establishing that the transaction is verified. Prior to submitting the transaction to the notary, the transaction is stripped of privacy data such that the notary is prevented from accessing privacy data associated with the transaction or the input state object. The step of verifying to one or more nodes of the distributed ledger that the transaction has been finalized comprises an electronic signature from a notarizing service.

Additional example embodiments of the present invention are directed to a system for finalizing an electronic transaction comprising: a distributed ledger subsystem for recording object states, wherein each object state comprises a legal prose document, contract code, a parameters document, and at least one electronic signature; a transaction subsystem for proposing a transaction comprising an input object state, a command, and an output object state; a validation subsystem for confirming the command of the proposed transaction conforms with the parameters and contract code of the input object state; contract code is executed for all contracts referenced by state objects whether they are input or output state objects; commands signify intention of the party constructing the transaction (ISSUE, TRANSFER, etc.) and map to the corresponding parts of the contract code which require executing to validate the transaction in question, a verification subsystem for verifying that the input object state has not been previous consumed by a prior transaction.

Still another example embodiment of the present invention is directed to an electronic transaction processing system, comprising: a database comprising one or more state objects, each state object comprising a legal prose document having an identifying hash, contract code having an identifying hash, a parameters document having an identifying hash, and at least one electronic signature of a party to the state object; a processor configured for receiving a transaction, the transaction comprising a command and identifying an input state object stored in the database; a processor configured to include a validation module, the validation module confirming the command of the transaction conforms with the contract code referenced by each of the contract types in the transaction; a processor configured to include a verification module, the verification module confirming that the input state object has not been previously consumed by a prior transaction; and a processor configured to create an output state object from the validated and verified transaction and record the output state object to the database.

In some embodiments the process of validation refers confirmation that the transaction conforms with the contract types identified in the transaction. In some embodiments, the process of verification determines whether a state object is a unique input or whether the state object has been consumed. Verification can be from a notary service, as described herein.

In some embodiments, validation of the transaction comprises gaining consensus between the parties that the proposed transaction is permissible by reference to the rules expressed in the contract code referenced by each of the contract types referenced in the transaction. Validation of the transaction may also include confirmation or gaining consensus that all necessary signatures associated with proposed transaction are present.

And yet another example embodiment of the present invention is directed to an electronic transaction comprising: an input state object comprising a contract code, a parameters document, and at least one electronic signature; a command establishing the desired processing of the input object code, the command further comprising an electronic signature; and an output object state comprising a contract code, a parameters document, and at least one electronic signature.

Further example embodiments of the present invention may additionally include one or more of the following features. The validation subsystem comprises a consensus protocol configured to confirm that the conformance of each of the contract code reference by each of the contract types referenced in the transaction; and to electronically sign the transaction to confirm the transaction is validated. A transaction uniqueness identification subsystem or notary service configured to assign a unique identification including a date time stamp to the proposed transaction. The notary service further comprises a notary protocol configured to identify the input state object, compare the input state object to a database of consumed state objects, verify that the input state object is available for consumption, apply a digital signature to the transaction establishing that the transaction is verified, recording the input state object in the database of consumed state objects. A privacy preserving service for screening private data associated with the transaction or the input state object from any third party or third party oracle that may not be a party to the transaction. The privacy preserving service references state objects or data within state objects by cryptographic hash to preserve privacy. The privacy preserving service may incorporate merkle tree logic structure.

Aspects of the present invention may realize one or more of the following advantages. Parties to an agreement may agree upon changes to the agreement. Privacy and confidentiality of an agreement may be maintained between two parties. Parties may avoid unnecessary global sharing of data. Only parties with a legitimate need to know are permitted to see data within an agreement. Work flow between firms may be choreographed without a central controller. Consensus between firms is achieved at the level of individual deals instead of at the system level. Supports, facilitates, and enables regulatory and supervisor observer nodes. Transactions are validated by parties to the transaction rather than a broader pool of unrelated validators. Allows recordation of an explicit link between human language legal prose documents and smart contract code built on industry-standard tools.

DETAILED DESCRIPTION

Figure 1:
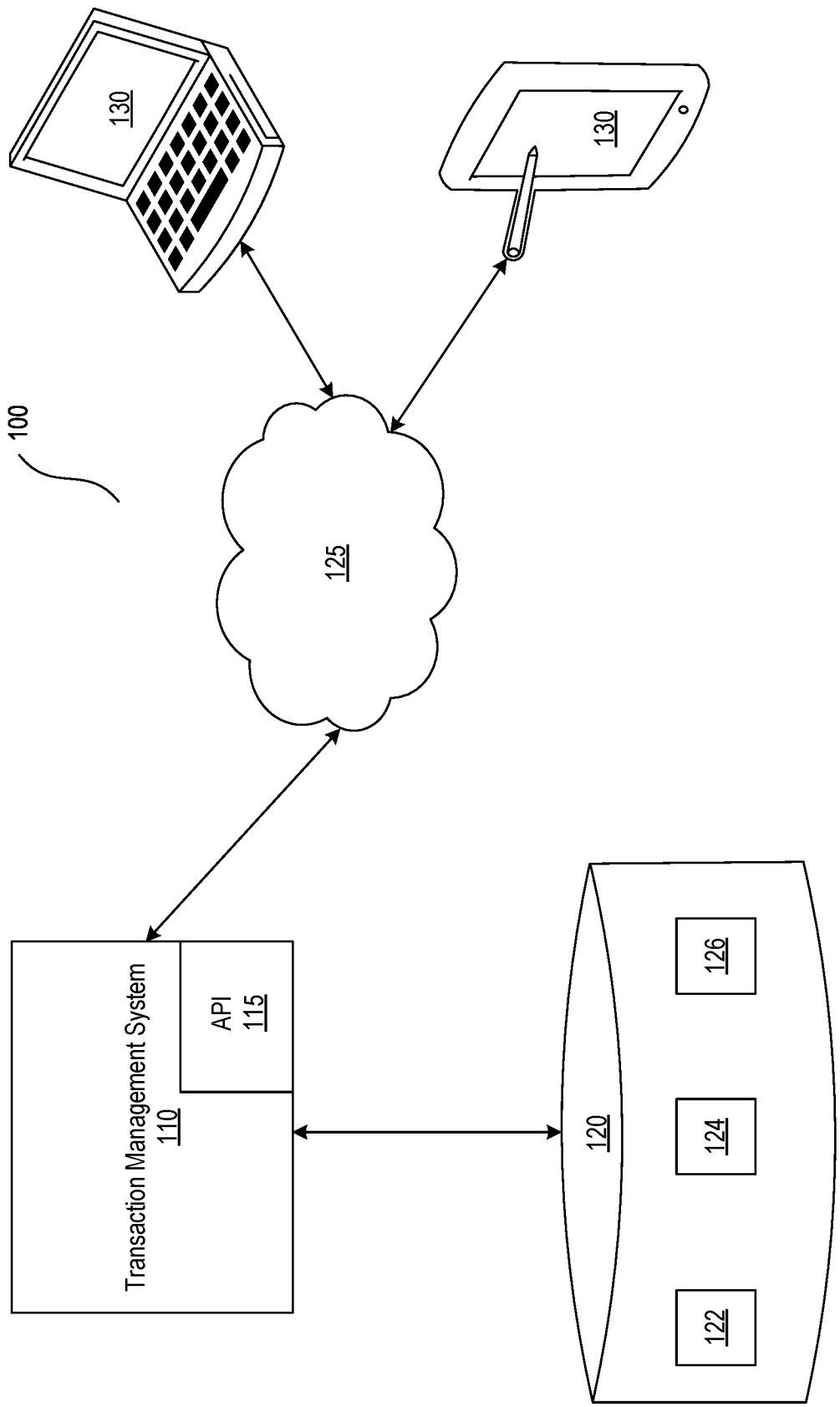
FIG. 1 is a block diagram illustrating a suitable computing environment for managing transactions using a private distributed ledger.

This disclosure is directed to example implementations and embodiments of a shared platform that allows parties to an agreement to maintain a shared understanding as to the state of that agreement. Other examples are directed to a dynamic electronic document shared between two or more parties and systems and methods of managing changes to that dynamic electronic document such that states of the document are agreed by the parties.

Examples of agreements and the parties to which they may relate might include:

Cash transactions and trading, such as s simple cash Balance—wherein Bank and customer agree that the bank owes the customer a certain quantity of money on deposit (i.e. the customer has $1,000,000 in the customer's account). Other cash or currency transactions are contemplated.

Securing and equity transactions, such as a simple security under custody-Custody Bank and an investor agree that the investor owns 1000 MegaCorp shares. Other securities, equities and financial transactions are contemplated.

Swaps, derivatives, hedges and complex financial instruments, such as an interest rate swap or a bilateral derivative agreement-Banks A and B agree that they are parties to the following IRS, which means they agree to exchange the following cash flows (netted) at predetermined scheduled times with an agreed payoff formula.

Examples of other dynamic electronic documents to which parties may need to agree might include:

Status and Deliverable Reports

Consumables and Order Reports

Supply Schedules

Work rosters

Other documents indicating a status change and the need for a party to act.

Indeed embodiments of the present invention are applicable to agreements that are translatable from legal prose to a machine readable code to indicate rights and obligations of a party with a transfer of assets, rights, or obligations.

Embodiments disclosed herein ensure that all parties remain in consensus as to the state of the agreement or document and the evolution of that state so that the parties can take necessary subsequent actions. One could argue that this is the essence of the "smart contract" and blockchain movement ensuring that the data held by different actors is and remains consistent as operations are applied to update that data.

But in example embodiments described herein, the focus on "states" of agreements is in contrast to prior-art systems where the data over which participants much reach consensus is the state of an entire ledger or the state of an entire virtual machine.

In an example implementation, a model for reaching consensus as to the state of agreements between parties starts with the smallest useful concept: a single agreement between two or more parties that requires synchronization and evolution through its life cycle. Thus, rather than reason about the state of an entire machine or global data structure, the focus of example embodiments herein is on individual agreements.

As used herein a "state object" represents an agreement between two or more parties, which are governed by machine-readable contract code, which references and is intended to implement portions of human-readable legal prose. A state object may comprise a digital or electronic document which records the existence, content and current state of an agreement between two or more parties. A state object may be shared only with those parties who have a legitimate reason to view it. Such parties may include debtors and creditors, parties on either side of a purchase, loan, trade or other transaction, regulators, beneficiaries, or others. A state object may include reference to at least two documents, (1) contract code, which is computer code that defines the permissible operations a transaction may perform on the state object, and (2) legal prose, which are the legal terms or agreed actions applicable to the specific agreement represented by the state object (e.g., for example the standard terms for an Interest Rate Swap). A state object may also comprise a parameters document, which is a document signed by a particular issuer of an asset, which provides specialization in the case that the legal prose is generic and requires population of specific fields of data or other content, for example, currency type, currency amount, temporal limitations, etc. A state object may be referenced by cryptographic hash, including all data held within the state object.

As used herein a "transaction" is used to advance from one instance or version of a state object to the next instance or version of a state object. That is, a transaction proposes and executes changes to the state object, which may impact the obligations of the parties to the underlying agreement, and may create, as an output, a new state object. A transaction may act on multiple state objects in a single transaction. A transaction refers to a state object by referencing the cryptographic hash of the state object. Transactions may be digitally signed documents that consume zero or more state objects as "input" and produce zero or more new state objects as "outputs." A zero input transaction is an issuance, such as issuing cash to an individual. A zero output transaction includes and extinguish command to effectively terminate a state object.

Transactions may specify one or more "commands," which drive which operations are performed and inform the system what parameters are required for consensus or validation of the transaction, such as reference to the correct cryptographic hash, presence of electronic signatures, or other validation parameters. With consensus reached and the transaction validated or confirmed, the input state object to a transaction may be considered consumed. That is, it is invalid to consume the same input state objects in two different transactions. A transaction may, however, consume and produce multiple state objects of various types.

In an example embodiment a valid transaction is one which complies with mandated or relevant rules specified in the associated contract code of input or output state objects and which is digitally signed by the party(ies) expected or implied by the contract code and commands. The concept of a transaction which consumes outputs of previous transactions and creates new outputs may be analogous for explanatory purposes to the "Unspent Transaction Output (UTXO)" model of Bitcoin. In the present disclosure, however, the outputs represent the states of individual agreements between two or more parties as reflected in the state object, rather than ownership of Bitcoin reflected in a general public distributed ledger.

The holder of a state object may establish its meaning via a link to the underlying legal prose and contract code, and establish its history by examining the preceding versions and associated transactions or optionally satisfy themselves of its provenance/history by examining a signature from a notary service to vouch for its uniqueness and that the transaction does not involve a previously consumed input state object. A holder of a state object may propose a successor version of the state object by constructing a transaction and taking that proposed transaction through the process of signing and confirmation through a time stamping and uniqueness service.

As used herein, the term "private distributed ledger" refers to a ledger system comprising state objects by which access to the ledger and the state objects is restricted based on parameters of proposed transactions, contract code, or other security parameters. Access to the state objects, content within the states objects, transaction information, associated metadata, or even the ledger itself may be restricted by only sending data to those who should have it and not sending data to those who should not have it. A global or central system with permission/access control does not have to be used because each participant's set of data is limited to the data each participant is allowed to hold.

As used herein, the term "uniqueness service" is a protocol by which transactions referencing one or more state objects are prioritized, for example by reference to a date time stamp, and/or validated.

FIG. 1 is a block diagram illustrating a suitable computing environment or managing transactions using a private distributed ledger. The computing environment 100 includes a transaction management system 110, which provides an Application Programming Interface (API) service 115 and/or via deployable software (local or cloud-based) configured to enable users, customers, enterprise systems, and so on, to access various different transaction management functions provided by the transaction management system 110. For example, a user at a computing device 130 (such as a desk top computer, mobile device, lap top, and so on) may upload, over a network 125 (e.g., the Internet), an application or other content associated with a transaction involving a state object supported by the transaction management system. In some embodiments transaction management system may communicate with other transaction management systems, or other computer systems instead of one or more end user terminals.

The content 140 associated with the transaction may contain various different scripts or modules, such as a javascript module 145, that facilitate communicating over the network 125 to the transaction management system 110 (e.g., calling the API 115), in order to access and retrieve certain information associated with the transaction, such as state object information (including contract code and legal prose), transaction command information, ownership information, licensing or purchasing information, unique identifiers, provenance information, and so on. The transaction management system 110 may store such information via distributed ledger technology in various databases or memory, either local to the system or in various cloud-based storage services.

For example, a database 120 may include content information 122 associated with digital content items or state objects, such as information describing the content of the state object, information representing the state objects (e.g., hash values), metadata associated with the digital state items, and so on. The database 120 may also include contract data or information 124, such as information associated with rights or obligations assigned to or associated with the state objects and/or use of the digital content of the state object or transaction, and one or more private distributed ledgers, such as block chains associated with the state objects that track transactions performed with respect to the digital content items.

The database 120 may include other types of data or information, such as user information (e.g., information associated with owners or recipients of content), payment information (e.g., information associated with monetary exchanges for content), and so on.

Further details regarding the components and methods performed by the transaction management system 110 are described herein.

Figure 2:
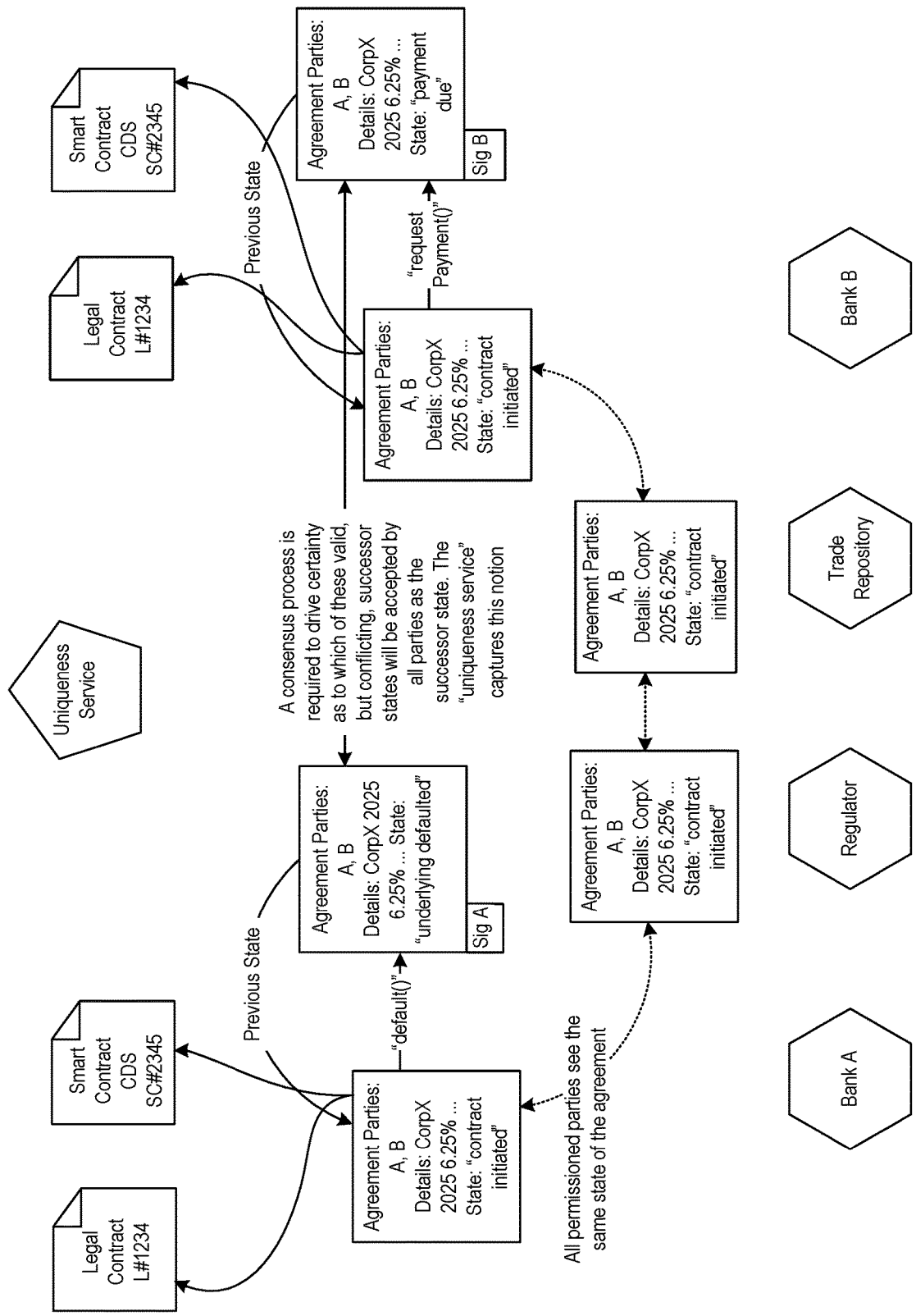
FIG. 2 is a block diagram of an example architecture in accordance with the present invention.

FIG. 2 illustrates an example architecture incorporating state objects, transactions between two parties, and a uniqueness service.

In the example illustrated in FIG. 2, the new state will flow through the process without difficulty. However, the architecture must guard against the situation that other parties may legitimately (or nefariously) propose a new transaction and hence new state objects at the same time.

Two parties can perfectly and validly decide to enter completely different states. An example would be that the buyer of a Credit Default Swap may wish to record that the underlying bond has encountered a default event, at the same time that the seller of the protection may have created a Transaction to record that a premium payment was due. If this is a possibility, then the smart contract must be designed to cope with this eventuality. A consensus method that resolves the conflict is required. But the architecture does not seek to merge conflicts. Instead, a single history relating to the object code must be resolved and provided. "Failed" updates must be reapplied to the latest version. This is similar in function to the blockchain model. However, the blockchain model resolves conflicts by replicating the entire ledger, in examples herein, a uniqueness service or notary evaluates proposed transactions and determines priority, by for example, a date-time stamp, thus ensuring that proposed transactions do not conflict and are operated on the latest version of the state object.

Therefore, for some state transitions, the ability to select between conflicting, yet valid, successor states is required. The "time stamping and uniqueness service" function provides this assurance, and is modeled as another party that participates in a state transition, otherwise known as a notary. In some examples the uniqueness service may be implemented as a blockchain (e.g. Similar to the anti-double spend function of Bitcoin). In other examples the uniqueness service may prioritize between conflicting state transitions using a pre-established order or other hierarchical preference.

Figure 3:
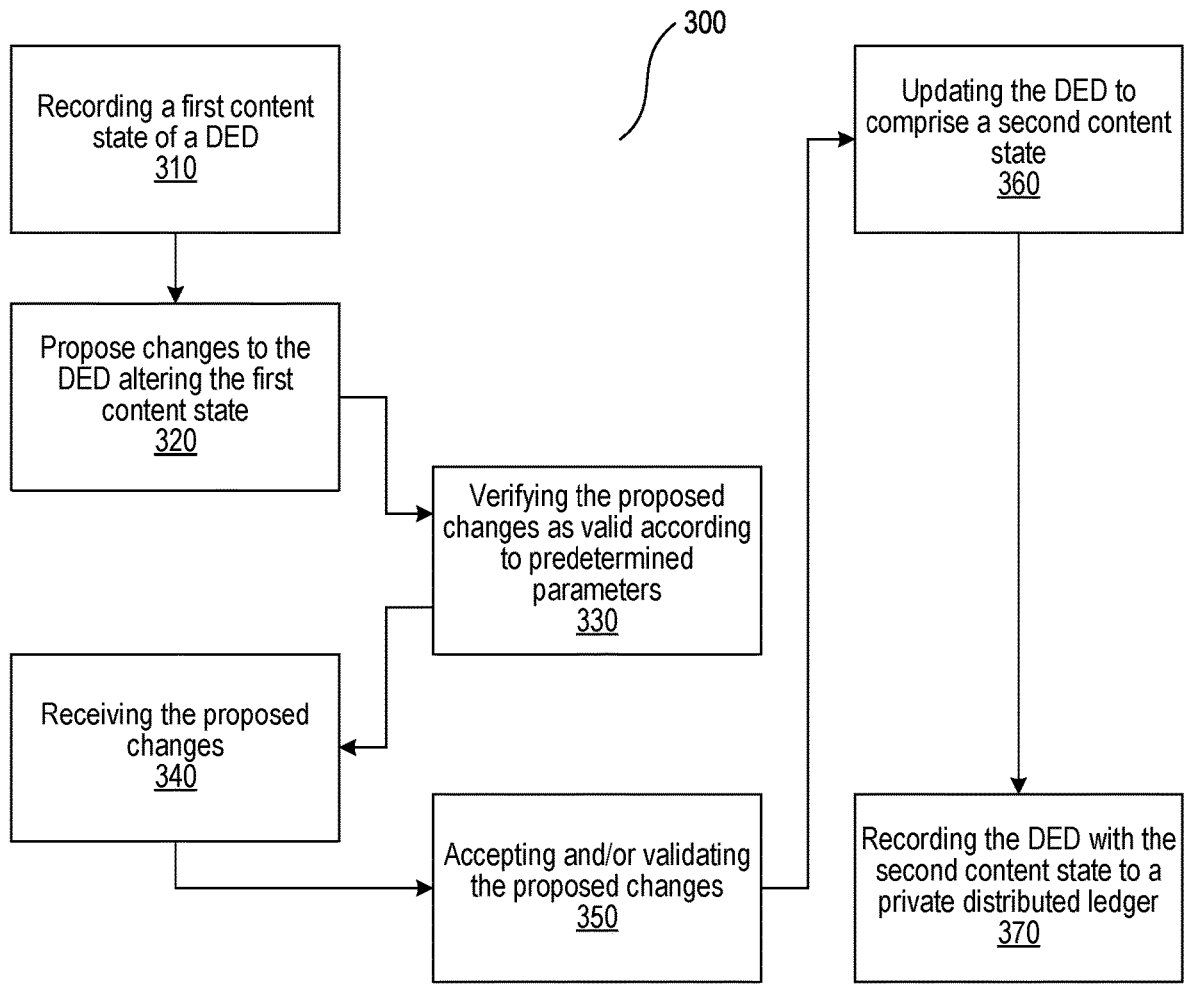
FIG. 3 is an example process of modifying a dynamic electronic document in accordance with the present invention.

With reference to FIG. 3, a method (300) of managing states of a dynamic electronic document is provided, wherein the method comprises the steps of: recording a dynamic electronic document establishing a first content state (310); proposing changes to the dynamic electronic document altering the first content state (320); verifying the proposed changes as valid (330); receiving the proposed changes (340); accepting and or validating the proposed changes (350); updating the dynamic electronic document having a second content state (360); and recording the dynamic electronic document to a private distributed ledger (370).

A dynamic electronic document may comprise a state object that in turn references a contract code and legal prose. In some embodiments a dynamic electronic document may represent any obligation between two parties including financial transactions, but it may also represent ownership of versions of a document, order and fulfillment forms, expense reports, maintenance request forms or maintenance logs, or virtually any electronic document to which two or more parties must agree to changing facts captured by the document. In recording a dynamic electronic document establishing a content state, the parties agree as to the status of the document, for example as the current status of the state object. The state object can be recorded on a private distributed ledger.

A party to the obligations referenced by the state object may propose a transaction by which the state of the dynamic electronic document are altered. In some examples a transaction proposes changes to the state object.

The transaction may be verified as including permissible changes to the state object. For example a transaction may include a command for transferring funds and require appropriate electronic signatures from the party holding the funds.

Figure 4:
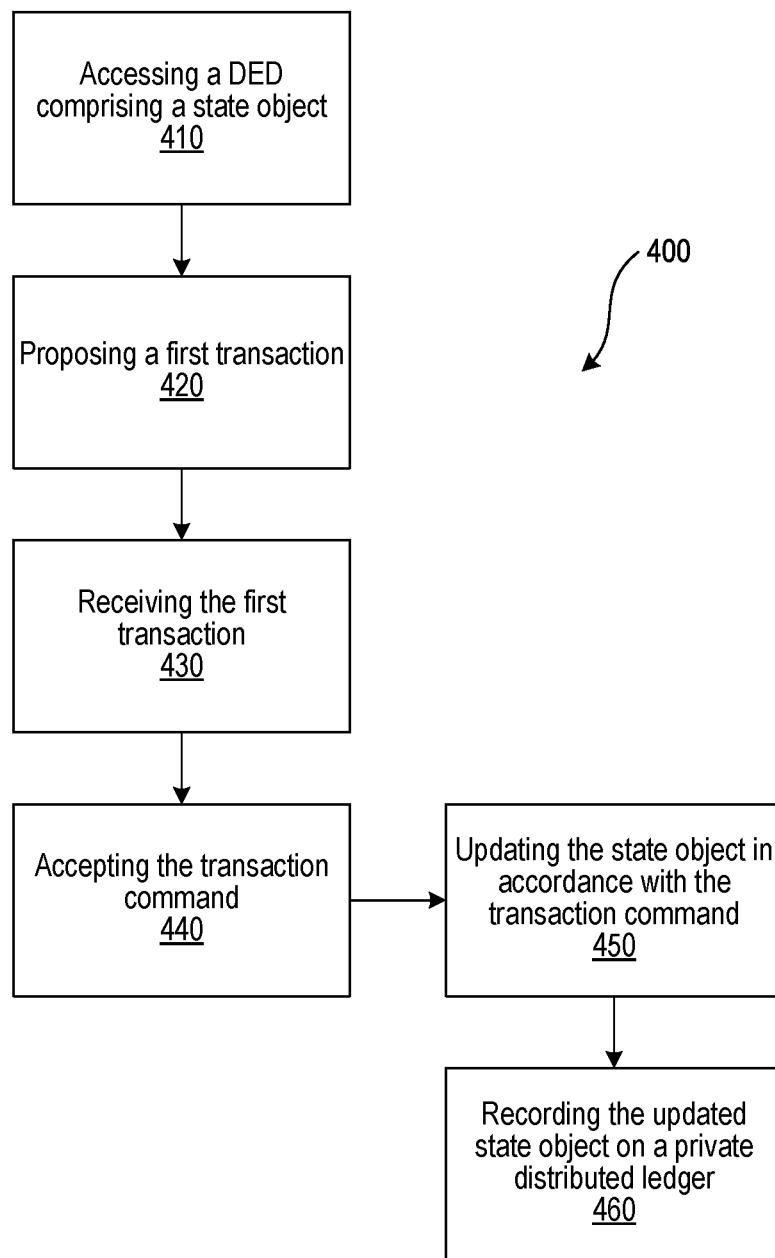
FIG. 4 is an example process of modifying a dynamic electronic document in accordance with the present invention.

With reference to FIG. 4, a method (400) for validating and communicating changes to a dynamic electronic document between a first and second user is provided. The method comprises the following steps. Accessing (410) a dynamic electronic document comprising a state object. Proposing a first transaction (420) comprising (or referencing) the state object, a transaction command, and validation protocol wherein, the state object represents the current version of the dynamic electronic document as represented on a private distributed ledger, the transaction command represents the proposed changes to the state object, and the validation protocol comprises reference to the contract code to gain consensus that the transaction is permissible under the contract code, the source of the transaction command, and/or, one or more parties to receive the first transaction. Receiving the first transaction (430) and accepting the transaction command (440). Updating the state object (450) of the dynamic electronic document to reflect the accepted proposed first transaction and recording the updated state object on a private distributed ledger (460).

Figure 5:
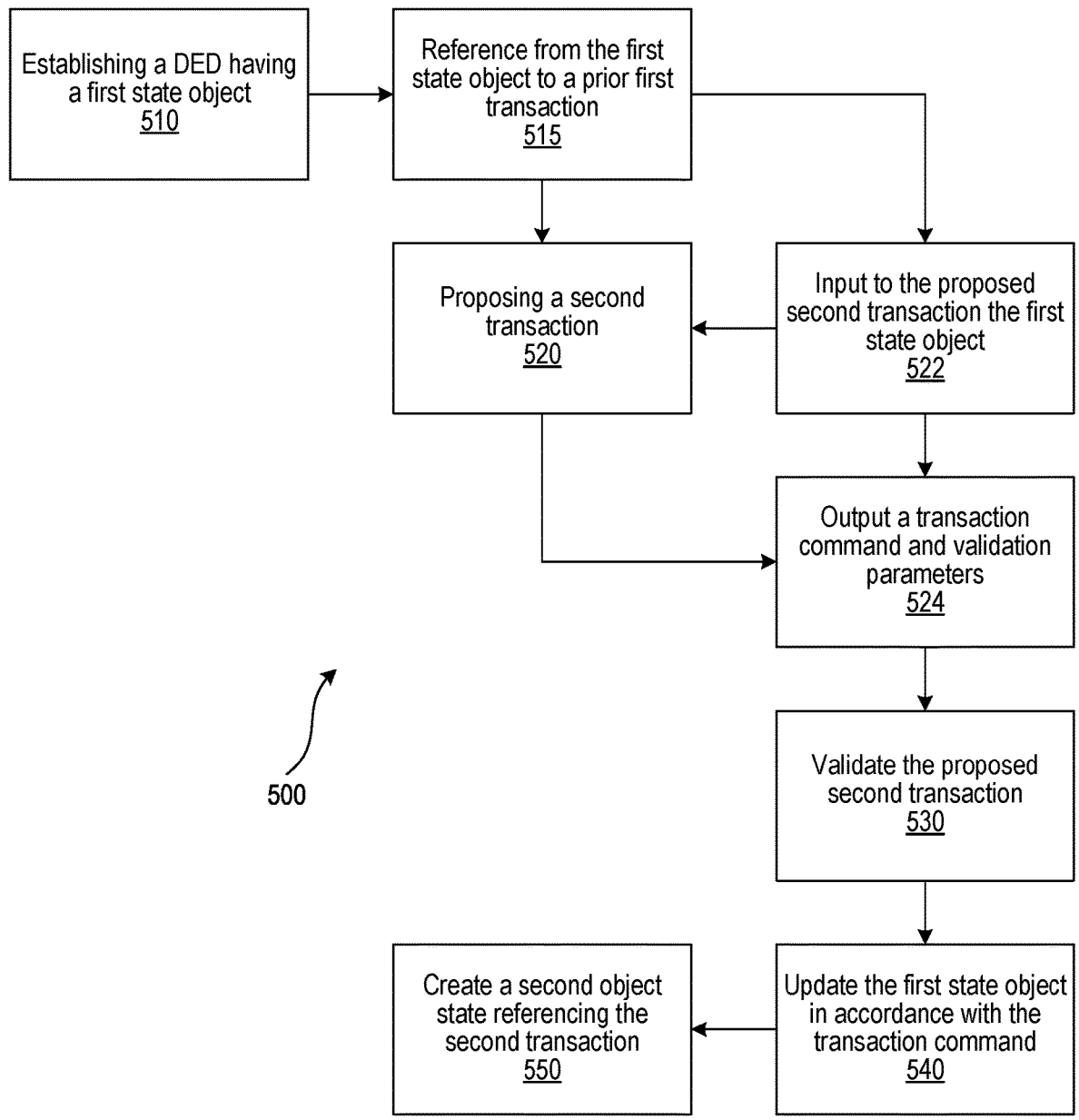
FIG. 5 is an example process of modifying a dynamic electronic document in accordance with the present invention.

With reference to FIG. 5, a method (500) for validating and communicating changes to dynamic electronic documents between multiple users, comprises the following steps. Establishing a dynamic electronic document (510) comprising a first state object. Proposing a transaction (520) comprising as an input (522) the first state object and as a transaction command (524) to alter the first state object as well as parameters required to validate the second transaction. Validating the proposed transaction (530). Updating the first state object (540) in accordance with the transaction command. A transaction creates as an output a second state object (550) referencing the prior state object and/or the second transaction on a private distributed ledger, wherein the only individuals having access to data or content associated with the first and/or second state object(s) after approval of the transaction are the individuals referenced in the state objects.

Figure 6:
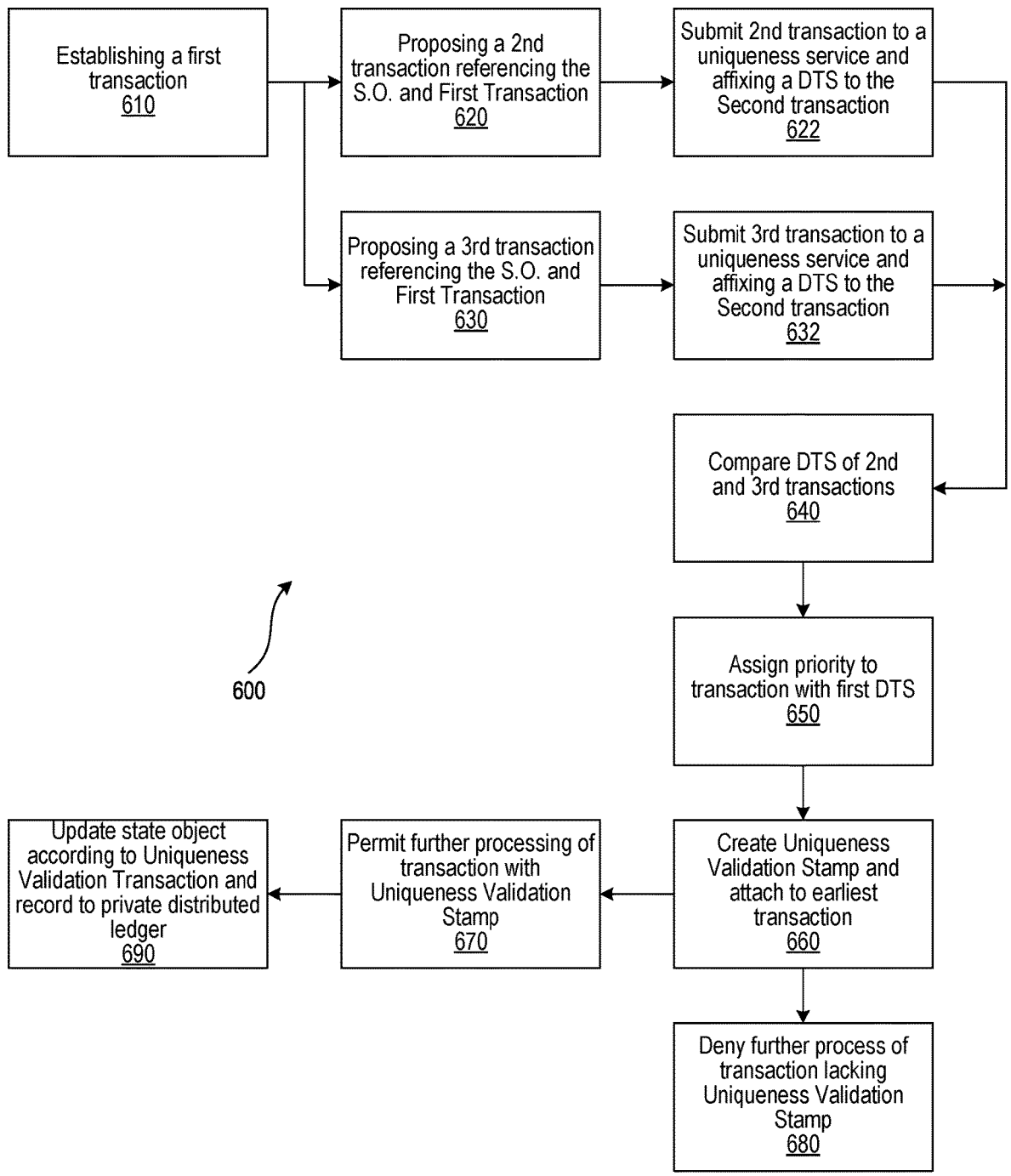
FIG. 6 is an example process of ensuring the uniqueness of a dynamic electronic document prior to issuing changes, in accordance with the present invention.
Figure 7:
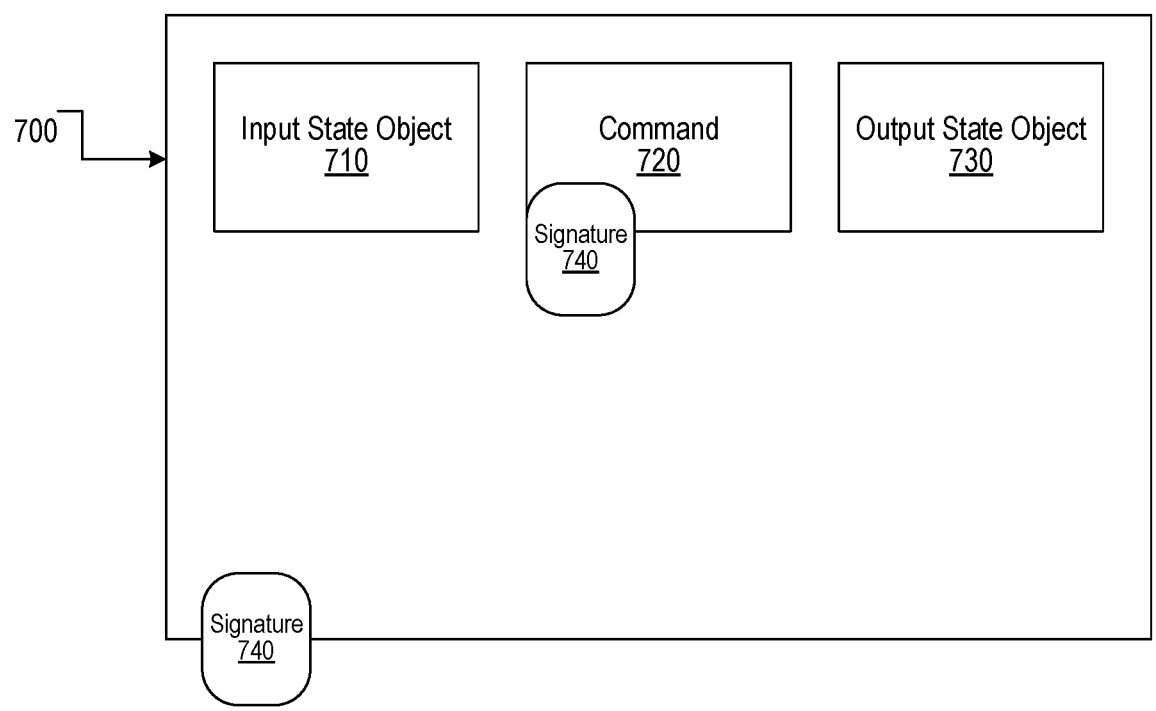
FIG. 7 is an example process of a transaction involving a state object, consistent with the present invention.

With reference to FIG. 6, a method (600) of notarizing the state of a dynamic electronic document comprises the following steps. Establishing a first transaction (610) comprising a state object. In a second transaction, referencing (620) the state object and first transaction, wherein a date-time stamp is affixed (625) to the state object and the second transaction. In a third transaction, referencing (630) the state object and the first transaction, wherein a date-time stamp may be affixed (632) to the state object and the third transaction. Determining the uniqueness of the second and third transactions (640) by comparing the date-time stamps of the second and third transactions. And assigning priority (650) to the earliest date-time stamp, thereby notarizing the earliest of the second or third transaction and creating a unique transaction (660). Permitting further processing (670) of the unique transaction. Prohibiting further processing (680) of the non-unique transaction. And updating the state object (690) on a private distributed ledger to reference the unique transaction.

In some embodiments, a proposed transaction much be submitted to a uniqueness service in order to establish the date-time stamp and priority of the proposed transaction. The uniqueness service will, in some instances have access to the state object and previous transactions. This may be undesirable as it introduces access to private or sensitive information that may only be shared between the parties obligated by the state object. As such, a transaction tear-off function is a protocol whereby information within a transaction and state object is identified by metadata tags and filtered to provide only allowable information from a transaction to be shared with the uniqueness service. In some embodiments the transaction tear-off function can be utilized with any third-party request for information about a transaction and state object, for example, regulators, auditors, beneficiaries, or credit rating agencies.

In various examples of the present invention updates to state objects are applied using transactions, which consume existing state objects and produce new state objects. There are two aspects of consensus:

1. Transaction validity: parties can reach certainty that a proposed update transaction defining output states is valid by checking that the associated contract code runs successfully and has all the required signatures; and that any transactions to which this transaction refers are also valid.
2. Transaction uniqueness: parties can reach certainty that the transaction in question is the unique consumer of all its input states. That is: there exists no other transaction, over which any parties have previously reached consensus (validity and uniqueness), that consumes any of the same states. Parties can agree on transaction validity by independently running the same contract code and validation logic. However, consensus over uniqueness requires a predetermined observer, which in many cases may be required to be independent.

In some example embodiments of the present invention consensus over transaction validity may be performed only by parties to the transaction in question. Therefore, data is only shared with those parties which are required to see it. Other platforms generally reach consensus at the ledger level. Thus, any given actor in a system sees only a subset of the overall data managed by the system as a whole. In example embodiments of the present invention, a piece of data may be considered "on-ledger" if at least two actors on the system are in consensus as to its existence and details and arbitrary combinations of actors are allowed to participate in the consensus process for any given piece of data. Data held by only one actor may be considered "off-ledger".

Example embodiments of the invention may include a "pluggable" uniqueness services, which may facilitate improved privacy, scalability, legal-system compatibility and algorithmic agility. A single service may be composed of many mutually untrusting nodes coordinating via a byzantine fault tolerant algorithm, or could be very simple, like a single machine. In some cases, such as when evolving a state requires the signatures of all relevant parties, there may be no need for a uniqueness service at all. It is important to note that these uniqueness services are required only to attest as to whether the states consumed by a given transaction have previously been consumed; they are not required to attest as to the validity of the transaction itself, which is a matter for the parties to the transaction. This means that the uniqueness services in some example embodiments do not see (or otherwise have access to) the full contents of any transactions, thereby improving privacy and scalability of the system compared with alternative blockchain designs. This design decision represents a key decision as to the acceptable trade-offs in shared ledger architectures.

State Objects:

In an example embodiment of the present invention a state object is a digital document that records the existence, content and current state of an agreement between two or more parties. In some examples a state object is an electronic agreement between two parties to a shared distributed ledger, such as a private or public distributed ledger.

The state object may comprise a contract code file that includes machine readable instructions defining permissible actions to which the electronic agreement may be associated with and a hash identifying the contract code. The contract code may include one or more rules or contextual data that help verify if a proposed transaction involving the state object is permissible. Contract code may translate contractual language between two parties into machine readable and actionable code. The contract language may be found in a legal prose document associated with the state object.

The state object may further comprise such a legal prose document that includes human readable text describing obligations of each party and a hash identifying the legal prose document. The legal prose document may include reference to assets, holdings, currency, obligations or the like. The legal prose document may set forth the obligations of the parties with regard to such assets, etc., but may also leave certain fields blank or unspecified. For example a specific value of currency to be transferred may be left unspecified, to be filled in by parties to an agreement relating to the state object.

The state object may further include parameters or a parameters file, which helps define the current state, value, or condition of the state object. For example the parameters may define the type of currency and the amount. Or may define an interest rate. Or other variable identified but not specifically defined in the legal prose document and the contract code.

And the state object may further comprise an electronic signature or other form of acknowledgment, such as a public or private key, such that the signed state object is an acknowledgement by the parties to the agreement that the state or condition of the state object (e.g., the value of the assets and the asset type, having an associated interest rate at a particular time) is valid and the parties are in agreement to the state or status.

Embodiments of state objects as defined herein facilitates the use of a global ledger, such as a public or private distributed ledger. A distributed or global ledger represents a trusted single source of information relating to the transactions recorded thereon. However, in examples of the current invention, although the ledger is shared, it is not the case that transactions and ledger entries are globally visible. In cases where transactions only involve a small subgroup of parties the relevant data (as defined by the state object) remains purely within that subgroup.

The state object may include a reference to (at least) two documents: contract code or computer code that defines the permissible operations a "transaction" may perform on the state object; and Legal Prose or the legal terms applicable to the specific agreement represented by the state object (e.g., the standard terms for an Interest Rate Swap). The legal prose and the contract code represent the bridge from the technical domain to the legal domain.

Additionally, the state object may comprise a parameters document typically signed by a particular issuer of an asset, which provides specialization in the case that the legal prose is generic and requires population with additional specializing detail. To ensure consistency in a global, shared system where not all data is visible to all participants, secure cryptographic hashes identify parties and data. The ledger is defined as a set of immutable states.

Example: Cash

Figure 8:
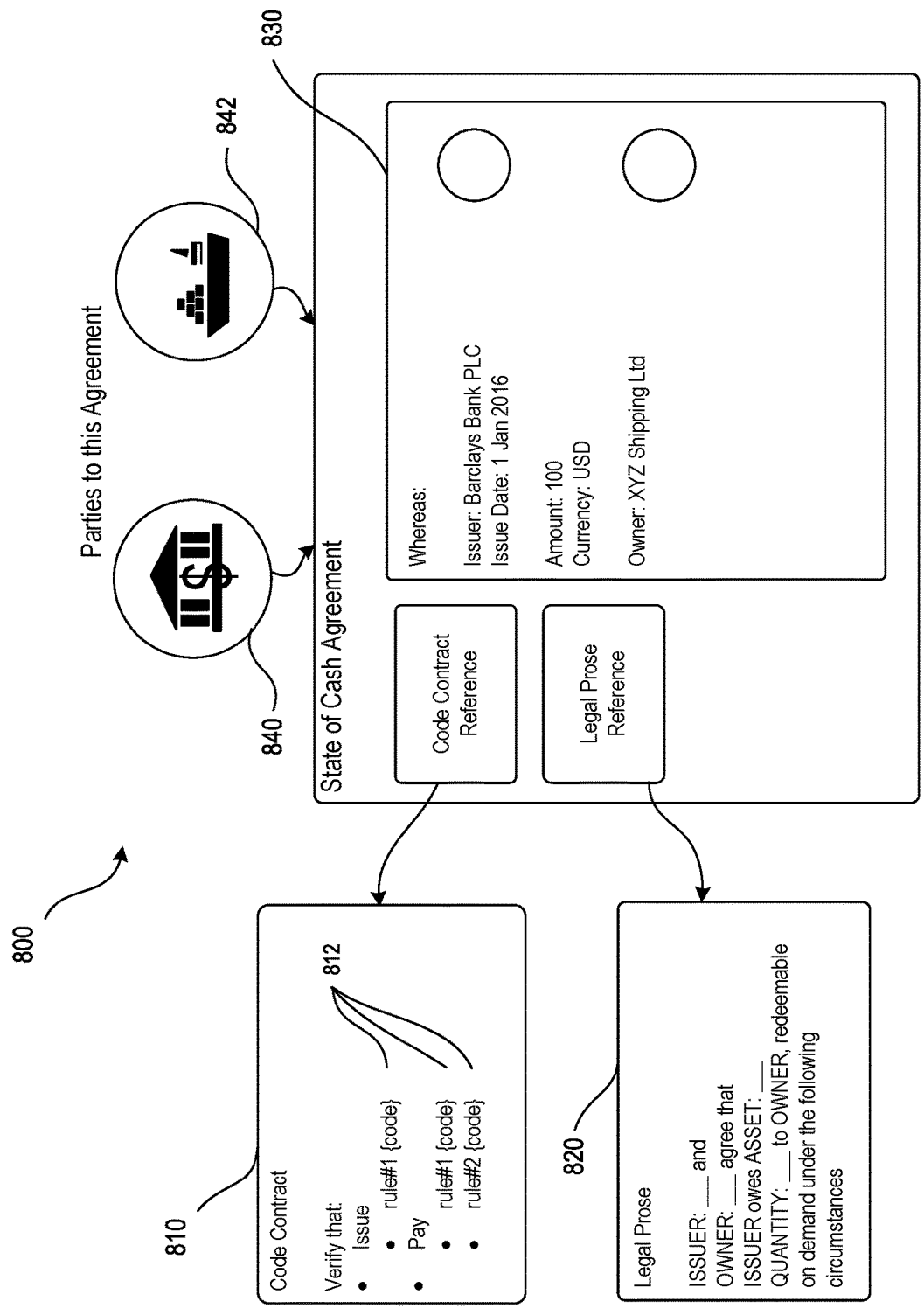
FIG. 8 is an illustrated example of a state object.

With Reference to FIG. 8, an exemplary state object 800 may comprise a contract code 810, legal prose 820, and parameters 830 referencing parties to the agreement 840 and 842.

Though state object 800 may contain arbitrary data, it may also contain at least a reference to the hash of Contract Code 810, which may be a program expressed in some byte code that runs sand boxed inside a virtual machine. State object 800 may also include a reference to the hash of a legal prose document 820, which provides legal context in a form that is recognized by a judicial or other dispute resolution system. Contract Code 810 may be globally shared pieces of business logic and may include one or more rules 812, as well as defining a verify function, which is a pure function that is able to determine whether the transition for the state object 800 is valid, regardless of which party calls the function. The verify function does not check that a transaction is in the interests of either party, only that its constraints are enforced, and nodes or parties must separately satisfy themselves the transaction is in their own interests.

In the example illustrated in FIG. 8, a stylized Cash State Object 800, represents the ownership of 100 USD. The object refers to its governing Contract Code 810 and associated Legal Prose 820. As this is a cash contract, the Legal Prose document 820 will specify the terms and conditions that pertain to a cash liability issued by one party to another: under what circumstances can the cash object be redeemed for a balance in a traditional bank account or in exchange for a wire transfer elsewhere. The legal prose document 820 may also address dispute resolution. In addition, the legal prose 820 will specify those rights, obligations and conditions associated with the contract which the parties agree will be automated through computer code, thereby explicitly delegating from the legal prose domain to the code domain.

Furthermore, and critically, the legal prose 820 may will also leave several pieces of information unspecified, such as: who is the issuer? what is the currency? The State Object contains these fields, as a parameter to the state object, in the example (we see the issuer here is ABC Bank and the currency is USD). The combination of the legal prose 820, contract code 830 and parameters 830 captured in the state object 800 plus relevant digital signatures 840 and 842 collectively define the agreement between the parties.

Figure 9:
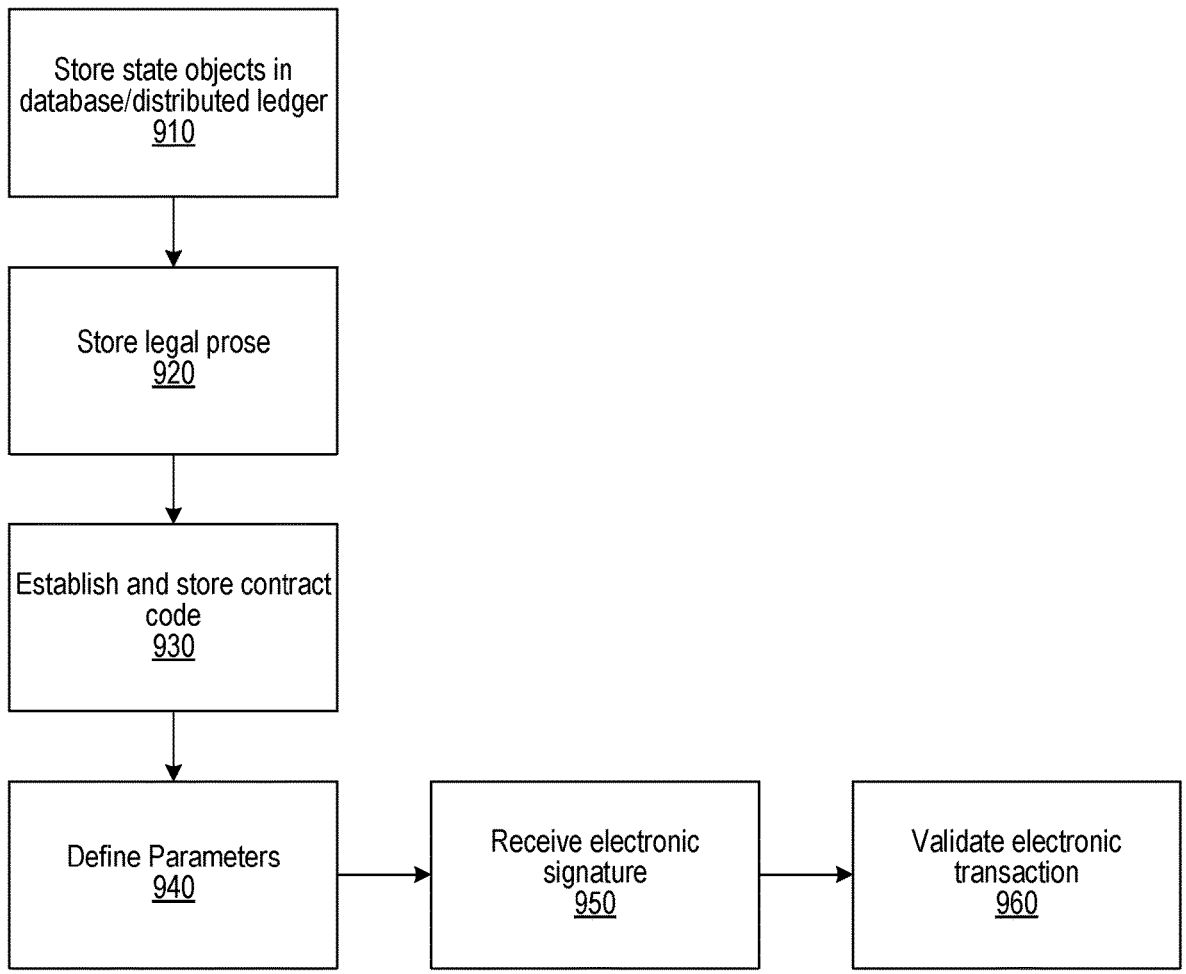
FIG. 9 is an illustrated example of a method establishing a state object.

FIG. 9 illustrates an exemplary method 900 of creating a state object defining an agreement between two parties to a distributed ledger. First a database for storing state objects is established by a processor at first node of a distributed ledger network (910). Then a legal prose document comprising human readable text describing obligations of each party and a hash identifying the legal prose document is stored on the database (920). The legal prose document includes one or more fields of undefined value. Contract code comprising machine readable instructions defining permissible actions to which the electronic agreement may be associated with and a hash identifying the contract code is then stored in database (930). The permissible actions are defined in the legal prose document. Parameters specific to the electronic agreement defining a state of the agreement are defined and stored (940). The parameters include values defining one or more of the undefined fields in the legal prose. Then the state object receives at least one electronic signature of a party to the electronic agreement (950). And with the receipt of the electronic signature, the state object is validated and established in the database (960).

Transactions:

Transactions are used to advance from one instance of a state object to the next. That is, transactions are processing of the agreement from one state object to another, for example the transfer of assets, goods, or currency from one party to another. Transactions are digitally signed documents that consume zero or more state objects as "Inputs" and produce zero or more new state objects as "Outputs". A transaction whose dependencies are valid, which is correctly signed and whose associated contracts' verify methods run successfully is considered valid. That is, consensus is reached and confirmed that the proposed transaction is permissible for the input state object. A valid transaction with a signature from its governing notary service (verification service) is considered final such that at the moment the transaction is signed by its governing notary, all its inputs are considered consumed and all its outputs become active. The notarization of a transaction provides atomicity and finality (confirmation).

In a simplified example, a transaction involves a state object having a proposed modification to an underlying asset. The proposed transaction must be validated—that is the modification must be consistent with the rules of the contract code and the asset at the heart of the state object. The proposed transaction must also be notarized or verified—that is the assets in the underlying state object cannot have previously been consumed by a different transaction. A validated and notarized transaction will consume the state object, perhaps reassign values and/or ownership, and establish an altered or new state object.

In embodiments of the present invention, it may be possible to share only portions of the state object for the verification and/or notarization of a transaction. For example verification can occur based on the transaction type without the notary, uniqueness service or verifying protocol knowing the identity of the parties. In this manner, a transaction, and the underling state object(s) may interact with one or more smart notaries to perform the verification and notarization functions.

Figure 10:
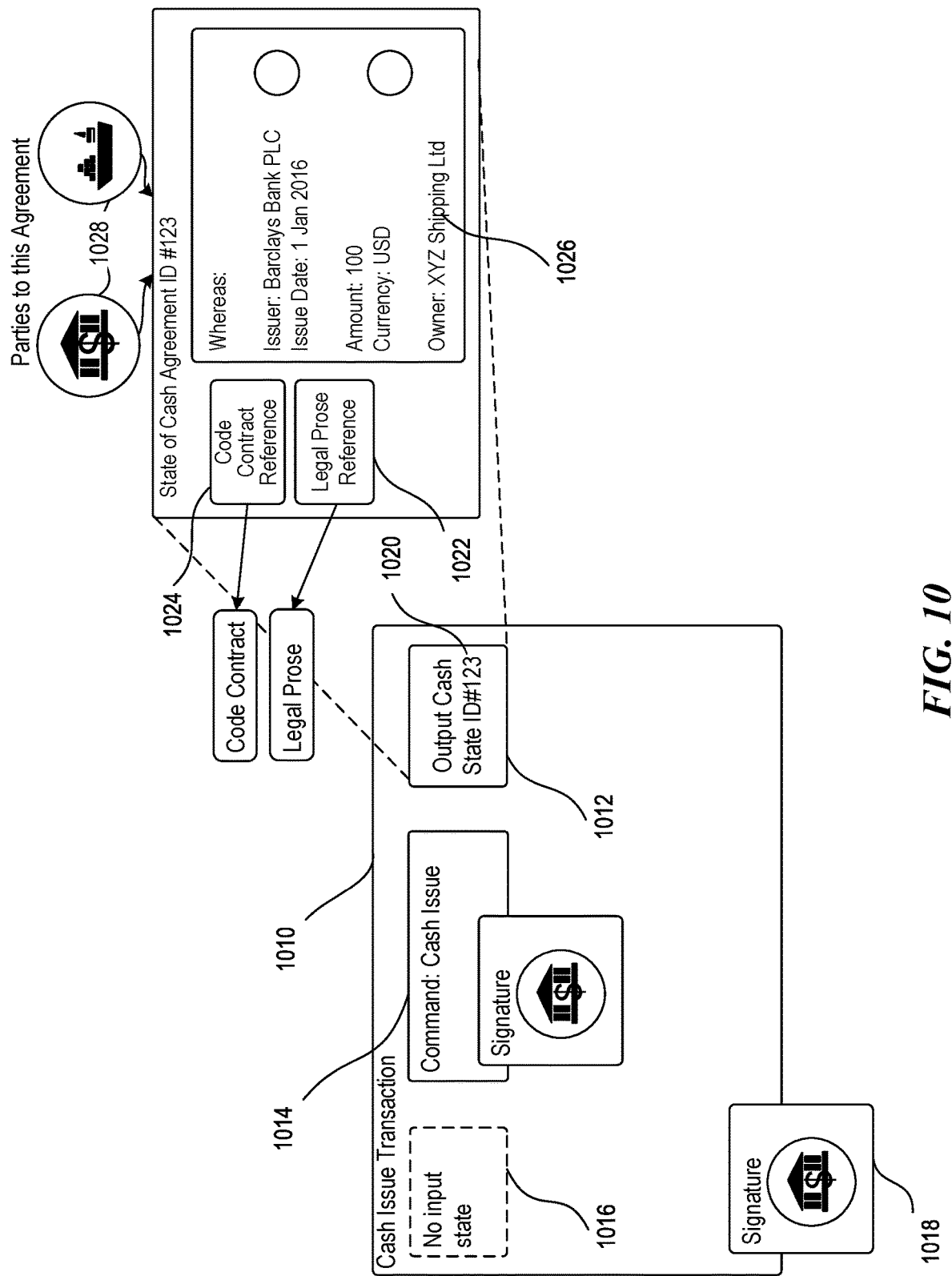
FIG. 10 is an example of a transaction involving a state object.

FIG. 10 illustrates an example of a transaction, specifically a cash issuance transaction. The transaction 1010 comprises an output state object (the newly issued cash), a command 1014 (signaling that the intent of the transaction is to issue the cash) and no inputs 1016 (since this is newly issued cash). The transaction is signed by the issuing bank 1018. The command may contain the public key of the signing party(ies). The output state object 1012 is provided a unique identification, 1020 and comprises the legal prose document 1022, the contract code 1024, a parameters document 1026. The parameters document 1026 may include specifics to field information that was intentionally left blank in the legal prose and contract code, such as the value or cash amount, type of currency, and date. The output state object may include electronic signatures 1028 representing the parties to the state object.

Once a transaction is successfully confirmed, the input state objects to a transaction are considered extinguished or consumed. It is invalid to consume the same input objects in two different transactions. For example, any attempt to finalize a subsequent transaction that attempts to consume any of the same inputs will fail at the point of validation or notarization.

Figure 11:
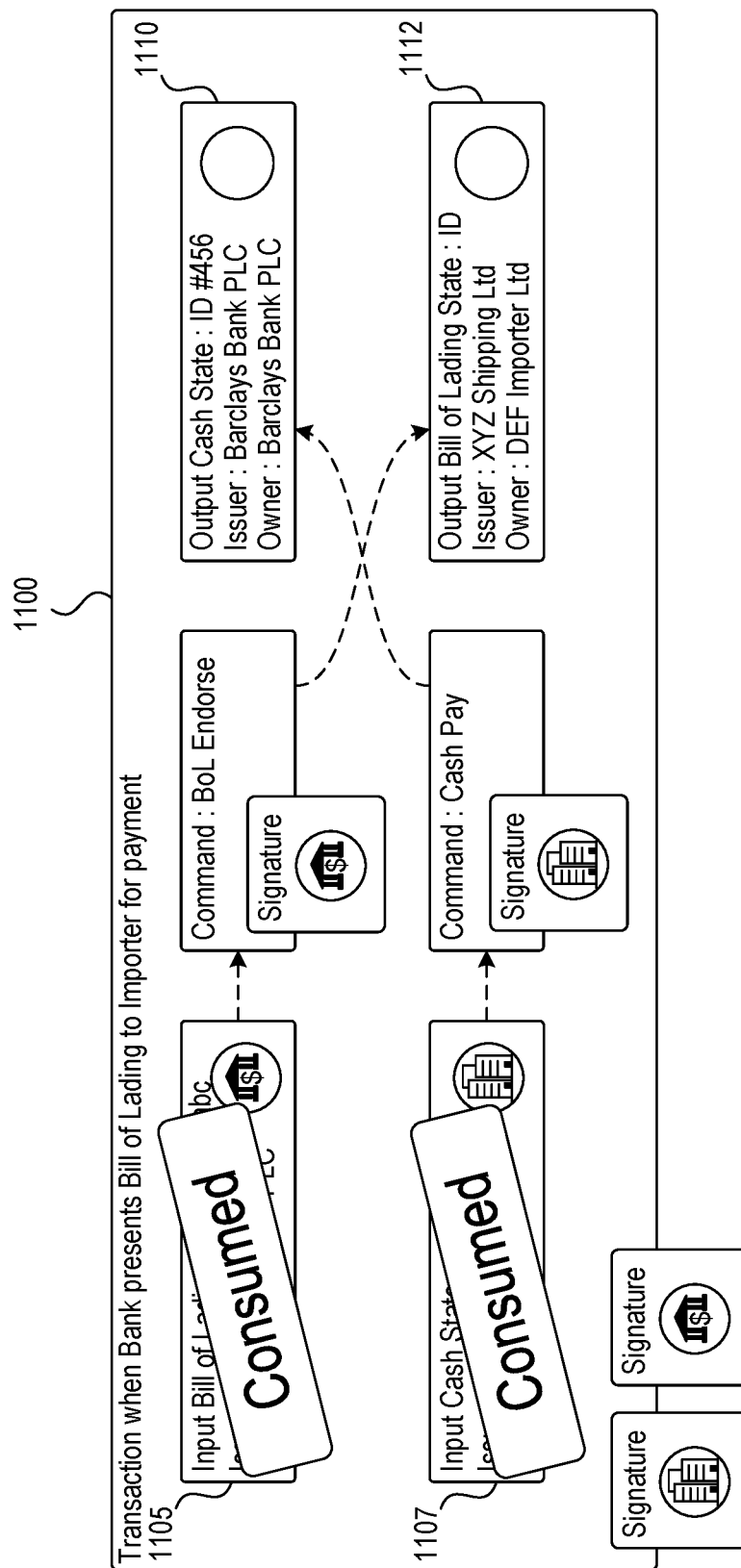
FIG. 11 is another example of a transaction involving a state object.

A Transaction may consume and produce multiple state objects of multiple types, as illustrated in FIG. 11, which shows an exchange, where two input states objects, 1105 and 1107, are consumed, and two output states objects, 1110 and 1112, are created, inside a single atomic transaction 1100. The business purpose of this transaction is to atomically pay an importer and endorse the associated bill of lading. States objects created as a result of one Transaction will ultimately be consumed in another, in an ongoing chain of transactions. So long as the input transaction is verified and validated, the parties to subsequent transactions need not perform any further diligence or trust activity to execute the transaction with a high degree of certainty and low risk.

Transaction Validation and Notarization

For a Transaction to be considered valid (and hence a candidate for finalization): its inputs states must be from valid transactions (recursively-such as one may iterate back through state chains and inspect the uniqueness of each state and validity of each state transition); it must be electronically signed by all parties identified in the transaction's commands; and it must be accepted by the verify function of every contract pointed to by the input and output states objects.

Upon receipt of a transaction, embodiments of the invention will download (from the peer who send the transaction) any dependent transactions that are not already available locally and any associated contract code that is not already available locally and verify the dependent transactions.

The system software running on the node will then identify every contract type represented in a transaction and pass the entire transaction to the transaction validation function of each contract type. This means the transaction validation function is called by a node once for each contract type per transaction and has access to the entire transaction.

The transaction validation function determines whether the transaction is consistent with the rules associated with that contract type, that is, does the contract meet the rules established by the legal prose and contract code of the state object. In general, "simpler" contracts (such as cash) will only analyze the cash movements inside the transaction and disregard other state objects, whereas "higher order" contracts may need to analyze the entire transaction.

The transaction validation function receives information relating to the transaction and the input state objects and compares the information for consistencies and inconsistencies, then provides a confirmation or refusal to the transaction. In some embodiments the transaction validation function confirms that contract code referenced by each of the contract types referenced in the transaction. Unlike systems such as Ethereum, where all nodes must execute all business logic, the present invention focuses only on affected parties to the transaction in question. For example, the party proposing a transaction executes the necessary business logic to construct the transaction and its new output states and sends this transaction to the affected parties. These parties are not required to re-run the same business logic, which could be computationally expensive and may be proprietary. Instead, their responsibility is to verify that the proposed transaction is valid. In some cases, they will do this simply by re-running the business logic and checking the results are the same.

In some embodiments of the present invention the consensus-critical business logic is tightly specified: just the verify method(s). Verify methods, which must be pure functions, are run in a tightly-controlled sandbox: only a very limited subset of the Java libraries (which are explicitly white listed) can be called: any non-deterministic operations are banned, as are operations that seek to interface with the outside world. A trusted external state may be provided through Oracles.

Once the transaction is validated by confirming the contract code referenced by each of the contract types referenced in the transaction, nodes store a copy of that transaction. Thus the data stored by nodes is an index of all current state objects to which they are party along with the historical set of transactions they processed to form this view.

Beyond inputs and outputs, transactions may also contain commands, small data packets that the platform does not interpret itself, but which can parameterize execution of the contracts or rules in the contract code. Commands may act as arguments to the verify function. Commands are how the transaction creator signals their intent, for example whether the transaction is intended to issue cash or move it from one party to another. Commands can also be used to inject small amounts of information into a transaction, such as a times tamp or an interest rate via an Oracle service. A specified Oracle is expected to sign the associated Transaction to attest to the facts asserted in a Command.

Each Command has a list of Public Keys associated with it. Before invoking any verify functions, the platform ensures that the transaction has been signed by every key listed in the Commands. Thus, a verify method must check that relevant commands specify appropriate public keys, but can rely on the platform to have ensured the associated parties have signed the transaction. This means that contract business logic in verify methods may be simplified, for example the verify logic for cash issuance merely needs to check that the Issue command specifies the Public Key of the issuer. A verify method that depends on the accuracy of an asserted times tamp in a command merely needs to check that the public key of the appropriate time stamping service has been specified. The task of verifying the signature is out sourced to the platform. Public keys may be random/identity-less for privacy, or linked to a well-known legal identity via a public key infrastructure (PKI) or other technique.

Commands may be embedded inside a Transaction. Sometimes, there's a larger piece of data that can be reused across many different transactions. For this use case Attachments may also be associated with the transaction. Transactions can refer to zero or more Attachments by hash. Attachments are always ZIP/JAR files, which may contain arbitrary content or data that is not consumed during the execution of a transaction in the same way that state objects are.

In some example embodiments of the invention there may be nothing that explicitly binds together specific Inputs, Outputs, Commands or Attachments. Instead it's up to the Contract Code to interpret the pieces inside the Transaction and ensure they fit together correctly. This is done to maximize flexibility for the contract developer.

A valid Transaction is one which complies with relevant rules specified in the associated Contract Code and which is digitally signed by the parties expected or implied by the Contract Code and Commands.

The concept of a Transaction which consumes outputs of previous transactions and creates new outputs is different from the "Unspent Transaction Output (UTXO)" model of Bitcoin, because, the outputs of the present invention represent the states of arbitrary agreements, rather than ownership of Bitcoin.

The holder of a State object can establish its meaning via the link to the Legal Prose and Contract Code, establish its history by examining the preceding versions and associated Transactions or optionally satisfy themselves of its provenance/history by examining a signature from one or more uniqueness services or notaries.

As discussed above, transactions may sometimes need to provide a Contract with data from the outside world. Examples may include stock prices, facts about events or the statuses of legal entities (e.g. bankruptcy), and so on. The providers of such facts, Oracles, provide facts and information to the ledger by signing transactions that contain commands they recognize, or by creating signed attachments. The commands contain the fact and the signature shows agreement to that fact.

In some embodiments of the present invention, Time is also modeled as a fact, with the signature of a special kind of oracle called a Time stamping Authority (TSA). A TSA signs a transaction if a pre-defined time stamping Command in it defines a after/before time window that includes "true time" (i.e. GPS time as calibrated to the US Naval Observatory). An Oracle may prefer to generate a signed Attachment if the fact it is creating is relatively static and may be referred to over and over again.

Notarization of a Transaction

The validation method(s) of transactions described herein determine whether a transaction is valid or not, according to the legal prose and contract code of the state object as well as the presence of necessary digital signatures. But mere validation that the transaction is permissible may be insufficient for complete consensus: parties to the transaction must also be sure that any given transaction does not conflict with another equally valid transaction. For this, parties to a transaction need to know which transaction is the unique consumer of its input state object(s).

Figure 12:
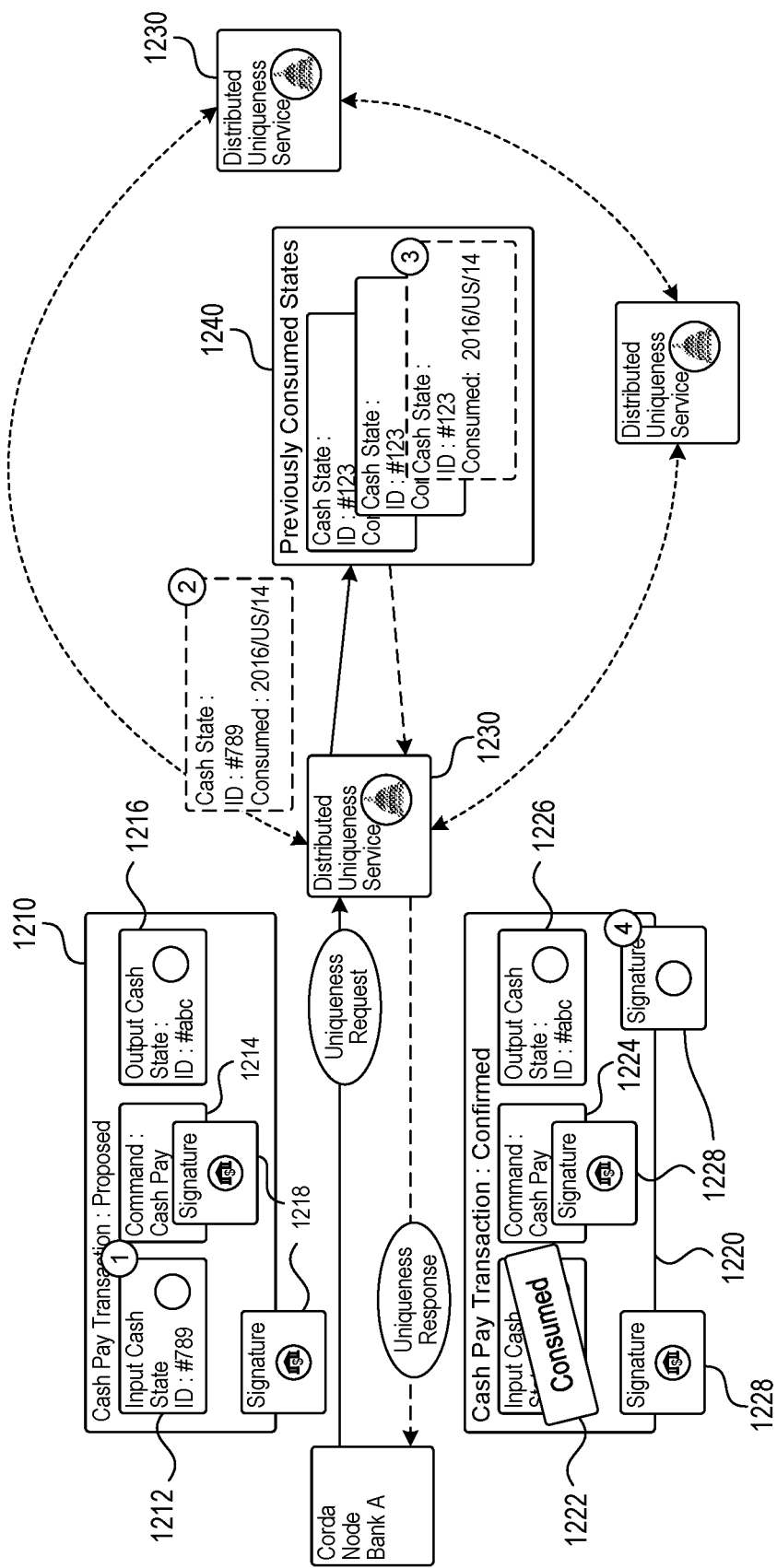
FIG. 12 is an example of a notarization service for a transaction involving a state object.

In some example embodiments, a transaction is final or confirmed or verified or notarized when signed by a Uniqueness Service (also known as a Notary Service). It is at the point of Notary signature that the transaction becomes final. FIG. 12 illustrates two valid transactions which both attempt to consume the same input. Only one transaction can become final—the Transaction that obtains a signature from the correct Notary service.

Thus, in example embodiments, consensus between parties to a transaction involves two distinct functions: Validity of Transactions is established by parties to an agreement running the relevant verify method(s). Finality or verification is established by the application of a signature from a Notary service. The Notary service can be a distributed system (eg running PBFT or practical Byzantine fault tolerance) operated by users of the system themselves or operated by one or more separate parties, perhaps with an explicitly and binding legal agreement. In some embodiments the Notary does not validate the transaction: the only information that must be provided to the Notary is a Merkle branch proving that a transaction with a specific ID (which the Notary is being invited to sign) consumes a specific set of inputs. A Transaction commits to the Notary that will be authoritative with respect to that Transaction's outputs.

As depicted in FIG. 12, two valid transactions are submitted to a notary service for verification. The first transaction 1210 comprises an input object state 1212, having ID #789, with a command 1214 to pay cash to a third party thereby creating output state object 1216. The first transaction 1210 and command 1214 have valid electronic signatures 1218.

The second transaction 1220 comprises an input object state 1222, having ID #789, with a command 1224 to pay cash to a third party thereby creating output state object 1226. The first transaction 1220 and command 1224 have valid electronic signatures 1228.

Both the first transaction 1210 and the second transaction 1220 are valid, as they conform to the contract code rules and have valid signatures. But both the first transaction 1210 and the second transaction 1220 attempt to consume the same input Cash state object, #789 only one can become final. The Distributed Uniqueness Service (or Notary) 1230 receives the second transaction 1220 first, establishes that Notary 1230 has not signed any other transaction which consumes input state #789, adds this state reference to a database 1240 associated with the notary service and (as an atomic activity) electronically signs the transaction, which the notary service then returns to the node. If the first transaction 1210 is ever sent to the Notary 1230, the Notary 1230 will refuse to sign the first transaction as input state #789 is now permanently consumed.

In example embodiments of the invention the validity of a Transaction is established by the parties to that Transaction. However, two or more Transactions could be valid and yet incompatible. For example a valid transaction that pays £100 to me and a transaction that pays the same £100 to you. Both transactions are valid and both candidates for finalization/confirmation/verification/notarization. But at most only one of the transactions may be finalized.

To arbitrate between two or more valid transactions that seek to consume the same input state(s), embodiments of the present invention require need an independent observer. This is the role of the Notary, or Uniqueness, service within exemplary systems of the present invention.

As previously described, State Objects can never be consumed more than once—this is analogous to the double-spend protection provided by Bitcoin. To ensure this, nodes may submit transactions to be signed by a Notary, also known as a Uniqueness Service. In some embodiments the Notary is responsible for two actions before it will sign a transaction. First looking up and ensuring that the Input State Objects in a presented Transaction have not been consumed by a prior Transaction. And second storing references to all Input State Objects that are to be consumed by this Transaction to ensure the Notary will never sign a subsequent Transaction which consumed any of the same state objects.

The signature of the Notary provides the recipient or beneficiary owner of a state object that is being assigned to them with certainty that it cannot have been assigned elsewhere first.

A generic method of finalization involving a transaction comprises: adding an unspent Input State Object to a proposed Transaction, which is then signed by parties to the Transaction, using a protocol. The protocol then validates that the proposed transaction is permissible according to the underlying contract or agreement. The protocol then sends the Transaction to the Notary, and the Notary validates that the Input State Object is not in its register of spent Input States Objects. The Notary adds the Input State Object to its register of spent Input States Objects. The Notary signs the Transaction and then returns the Transaction to the parties involved in the Transaction.

In some embodiments the Notary evaluates the unique identification of the input state object to the transaction and determines whether that state object has been consumed. If the state object has not been consumed the Notary records the input state object as consumed it the notary database and transmits to the system that the transaction is finalized. The transaction then creates an output state object in accordance with the parameters of the contract or agreement.

Figure 13:
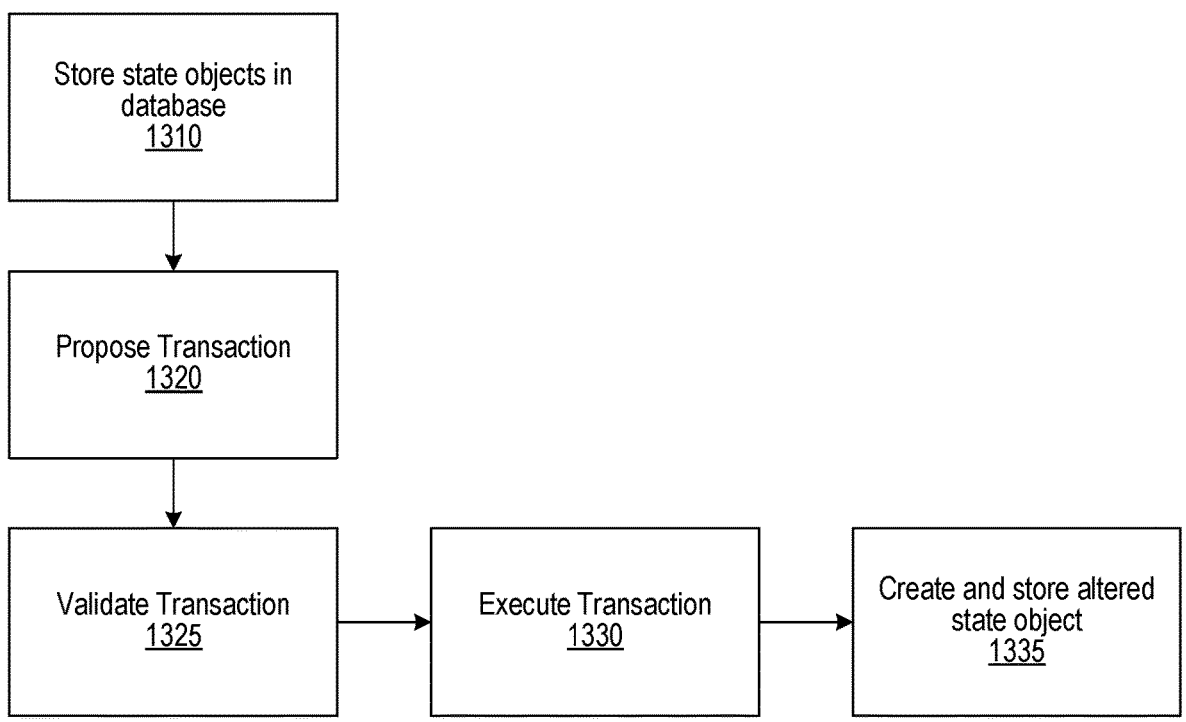
FIG. 13 is a flow chart of an example method of the present invention.

FIG. 13 illustrates a method of executing a transaction relating to an electronic agreement. The method 1300 comprises the steps of storing multiple state objects in a database at a node of a distributed ledger network (1310). Proposing a transaction between two parties that alters the state of a first state object (1320). Verifying that the proposed transaction is a valid transaction according to the rules of the first state object (1325). Executing the proposed transaction by altering the state of the first state object (1330). And storing the altered first state object in the database at a node of a distributed ledger (1335). The first state object and the altered first state object may be shared between the parties of the transaction and stored in the database while preventing access to such state objects by unrelated parties having access to the database.

Figure 14:
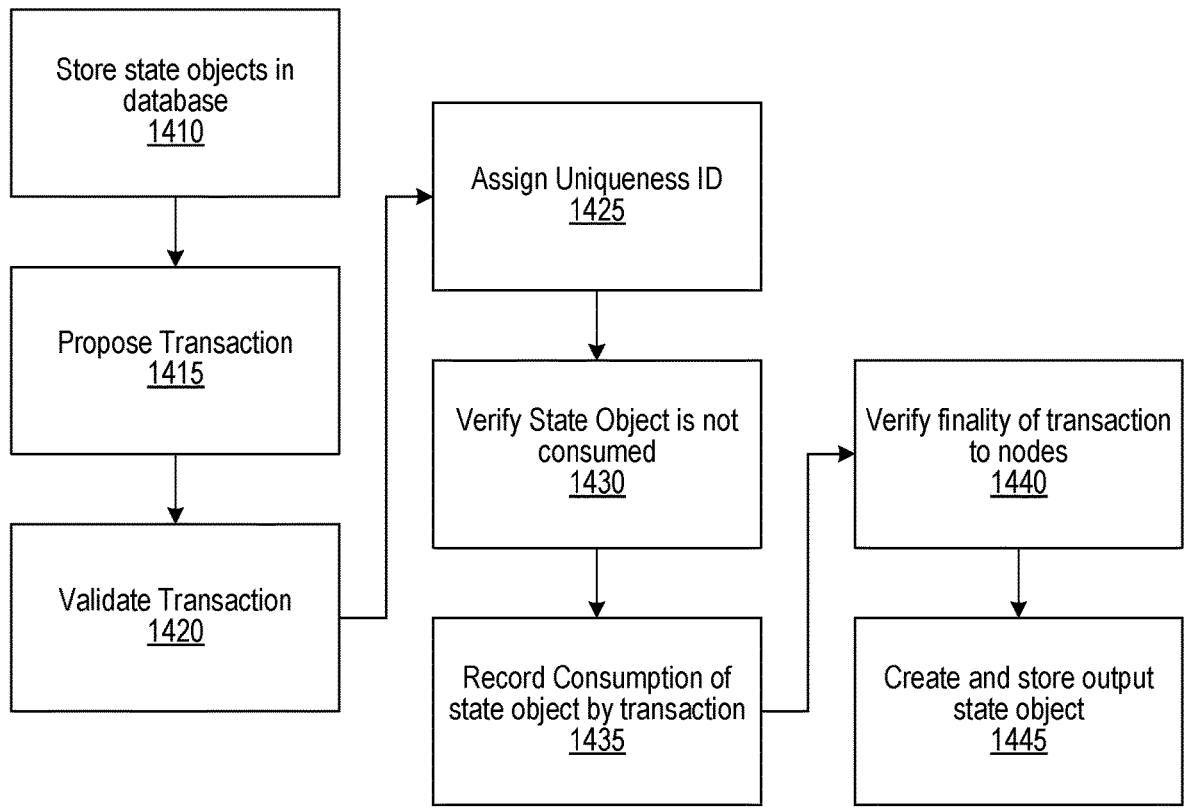
FIG. 14 is a flow chart of an example method of the present invention.

FIG. 14 illustrates a method of finalizing an electronic transaction between two parties The method 1400 comprises storing at one or more nodes of a distributed ledger one or more input state objects (1410). The input state objects may comprise a legal prose document, contract code, a parameter document and a digital signature as disclosed in other embodiments herein.

The method 1400 further comprises the step of proposing a transaction relating to the one more input state objects (1415), wherein the transaction comprises an input state object, a command, and an output state object. The output state object may also comprise a legal prose document, contract code, a parameters document, and an electronic signatures.

The method 1400 then includes the step of validating the proposed transaction (1420), wherein validation comprises referencing the command of the transaction with the parameters and rules of the input state object and confirming electronic signatures for the input state object and transaction. In some embodiment validation includes confirming the contract code referenced by each of the contract types referenced in the transaction The process of validating the proposed transaction is performed using a sub-process comprising: confirming by a party to the transaction that the transaction conforms with the contract code and parameter of the input state object, and signing by electronic signature the transaction after confirming the transaction conforms to at least the contract code of the input state object. The process of validating the proposed transaction may be performed using a sub-process comprising: screening privacy data from the transaction and input state objects, wherein privacy data includes party identity or other data marked as private; and signing the transaction by the validating protocol and establishing that the proposed transaction is valid.

The method 1400 also includes the step of assigning a uniqueness identification to the transaction (1425). The uniqueness identification may be a date time stamp and may be assigned by a uniqueness or notary service or a date time service.

The process 1400 continues with the step of verifying that the input state object has not previously been consumed by a prior transaction (1430). This may be done by submitting the proposed transaction to a notary service configured to compare the input state object of the transaction to a database of consumed state objects; determine whether the input state object has been previously consumed; record that the input state object is consumed by the proposed transaction; and electronically sign the transaction establishing that the transaction is verified.

The method 1400 further records in a database the consumption of the input state object (1435). And then verifies to one or more nodes in the distributed ledger that the transaction is finalized (1440). The notary service may electronically sign the transaction to indicate the verified transaction. And storing an output state object reflecting the outcome of the transaction (1445).

CONCLUSION

The techniques introduced herein can be implemented by, for example, programmable circuitry (e.g., one or more microprocessors) programmed with software and/or firmware, or entirely in special-purpose hardware circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

We claim:

1. A method performed by a first host computer system of a node of a first party for finalizing an electronic transaction between the first party and a second party, wherein the node is a node of a private distributed ledger, the method comprising:

accessing, by the first host computer system, a first database of state objects of the private distributed ledger for storing state objects to which the first party is a party, wherein the private distributed ledger is not a blockchain;

receiving, by the first host computer system, a proposed transaction that is between the first party and the second party and comprises an input state object having a hash that identifies, contract code having rules, a command, and an output state object;

validating, by the first host computer system, the proposed transaction to generate a validated transaction, wherein validation comprises referencing the rules of the contract code of the input state object, executing by a virtual machine the contract code identified by the hash to confirm that the proposed transaction conforms to the rules, and confirming electronic signatures for the input state object and the proposed transaction;

verifying, by the first host computer system, that the input state object of the validated transaction has not previously been consumed by a prior transaction, by the first host computer system submitting the validated transaction to a notary service to the private distributed ledger, so that the notary service can return to the first host computer system a notarized transaction has been finalized based on the input state object not being in a notary database of consumed state objects that is maintained by the notary service, the input state object being added to the notary database, and the proposed transaction being signed with an electronic signature of the notary service to generate the notarized transaction; send to receiving, by the first host computer system, the notarized transaction; and storing, by the first host computer system, the output state object of the notarized transaction in the first database.

2. The method of claim 1 wherein prior to submitting the validated transaction to the notary service, the validated transaction is stripped of privacy data such that the notary service is prevented from accessing privacy data associated with the validated transaction or the input state object.

3. A first host computer system of a node of a first party for finalizing an electronic transaction between the first party and a second party, wherein the node is a node of a private distributed ledger, the first host computer system comprising:

one or more computer-readable storage mediums for storing computer-executable instructions for controlling the one or more computing systems to:

access, by the first host computer system, a first database of state objects of the private distributed ledger for storing state objects to which the first party is a party, wherein the private distributed ledger is not a blockchain;

receive, by the first host computer system, a proposed transaction that is between the first party and the second party and comprises an input state object having a hash that identifies contract code having rules, a command, and an output state object;

validate, by the first host computer system, the proposed transaction to generate a validated transaction, wherein validation comprises referencing the rules of the contract code of the input state object, executing by a virtual machine the contract code identified by the hash to confirm that the proposed transaction conforms to the rules, and confirming electronic signatures for the input state object and the proposed transaction;

verify, by the first host computer system, that the input state object of the validated transaction has not previously been consumed by a prior transaction, by the first host computer system submitting the validated transaction to a notary service to the private distributed ledger, so that the notary service can return to the first host computer system a notarized transaction has been finalized based on the input state object not being in a notary database of consumed state objects that is maintained by the notary service, the input state object being added to the notary database, and the proposed transaction being signed with an electronic signature of the notary service to generate the notarized transaction;

receive, by the first host computer system, the notarized transaction; and store, by the first host computer system, the output state object of the notarized transaction in the first database; and one or more processors for executing the computer-executable instructions stored in the one or more computer-readable storage mediums.

4. The first host computer system of claim 3 wherein prior to the validated transaction being submitted to the notary service, the validated transaction is stripped of privacy data such that the notary service is prevented from accessing privacy data associated with the validated transaction or the input state object.

\* \* \* \* \*

UNITED STATES PATENT AND TRADEMARK OFFICE
CERTIFICATE OF CORRECTION

PATENT NO. : 10,529,041 B2  
APPLICATION NO. : 15/243473  
DATED : January 7, 2020  
INVENTOR(S) : Richard Gendal Brown et al.

Page 1 of 1

It is certified that error appears in the above-identified patent and that said Letters Patent is hereby corrected as shown below:

On the Title Page

Item (73), in Column 1, in "Assignee", Line 1, delete "RS LTD.," and insert -- R3 LTD., --, therefor.

In the Specification

In Column 11, Lines 17-18, delete "desk top" and insert -- desktop --, therefor.

In Column 11, Line 18, delete "lap top," and insert -- laptop, --, therefor.

In Column 12, Line 41, delete "and or" and insert -- and/or --, therefor.

In Column 16, Line 4, delete "sand boxed" and insert -- sandboxed --, therefor.

In Column 20, Line 37, delete "(eg" and insert -- (e.g., --, therefor.

In Column 22, Line 67, delete "hardwire" and insert -- hardwired --, therefor.

In the Claims

In Column 24, Line 48, in Claim 1, delete "identifies," and insert -- identifies --, therefor.

Signed and Sealed this  
Twenty-fourth Day of March, 2020

Andrei Iancu  
*Director of the United States Patent and Trademark Office*